Sept. 7, 1965  F. T. SMITH  3,204,577
OVERHEAD CRANE WITH SKEW CONTROL
Filed June 23, 1960  11 Sheets-Sheet 3
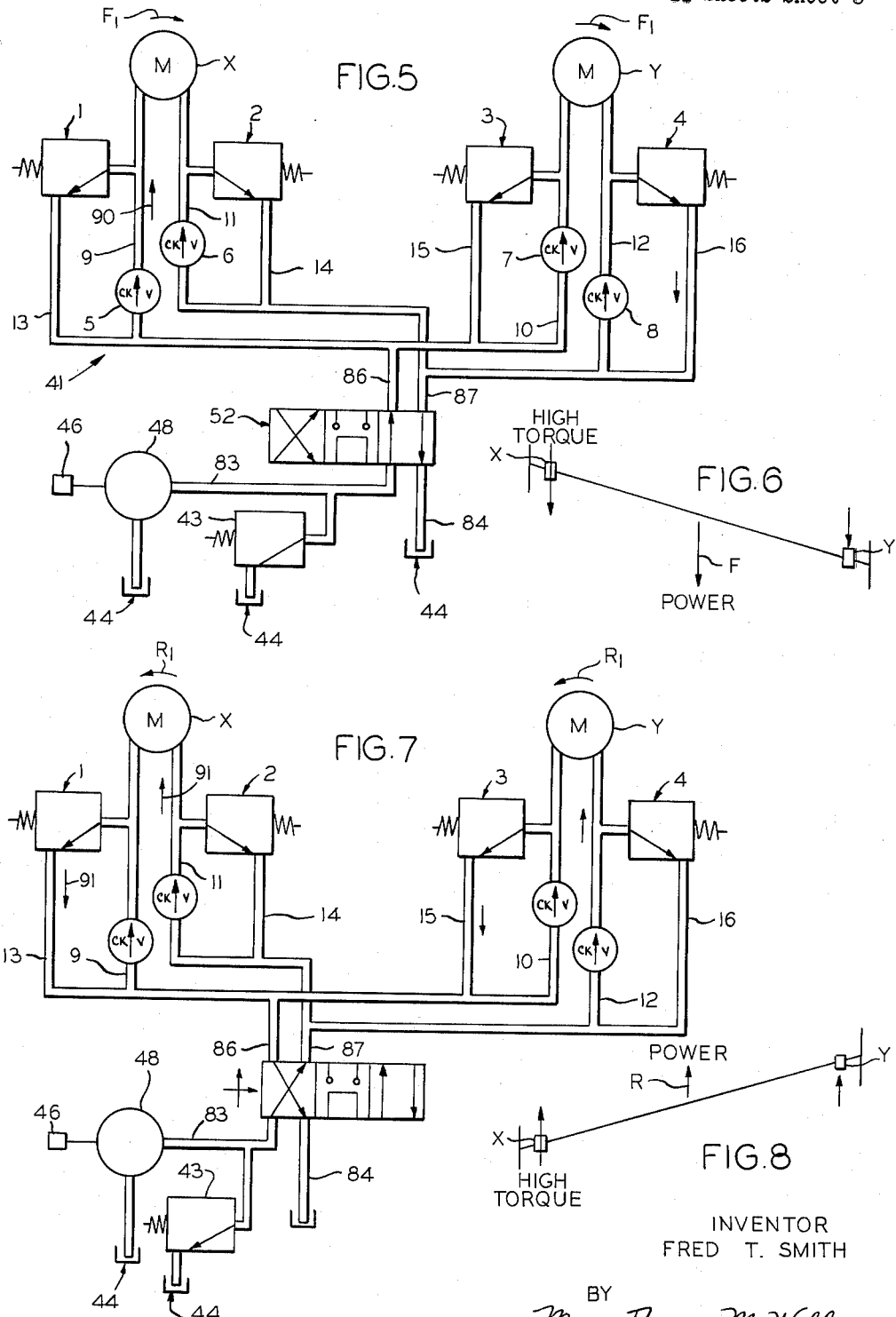
INVENTOR
FRED T. SMITH
BY
Mann, Brown & McWilliams
ATTORNEYS Sept. 7, 1965          F. T. SMITH          3,204,577
OVERHEAD CRANE WITH SKEW CONTROL
Filed June 23, 1960          11 Sheets-Sheet 4
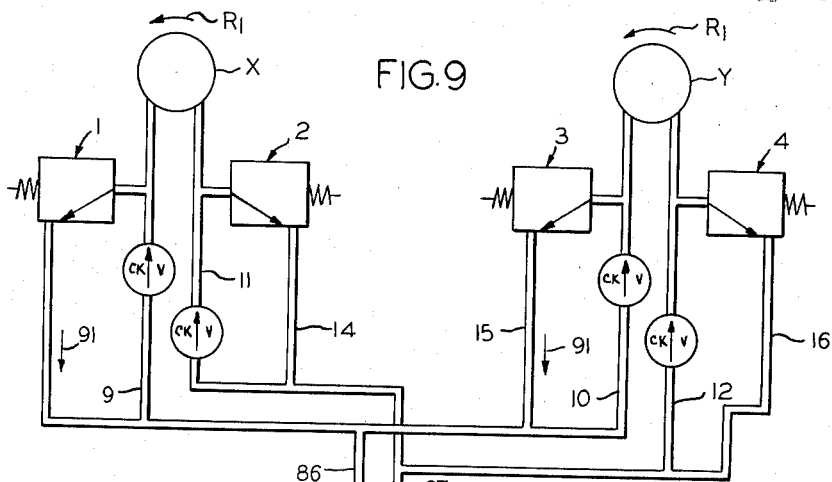
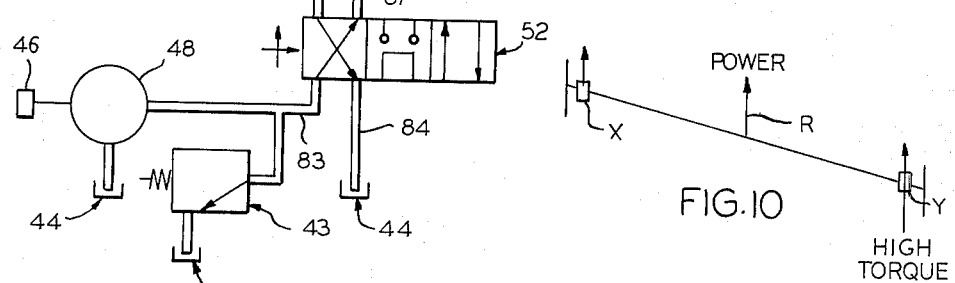
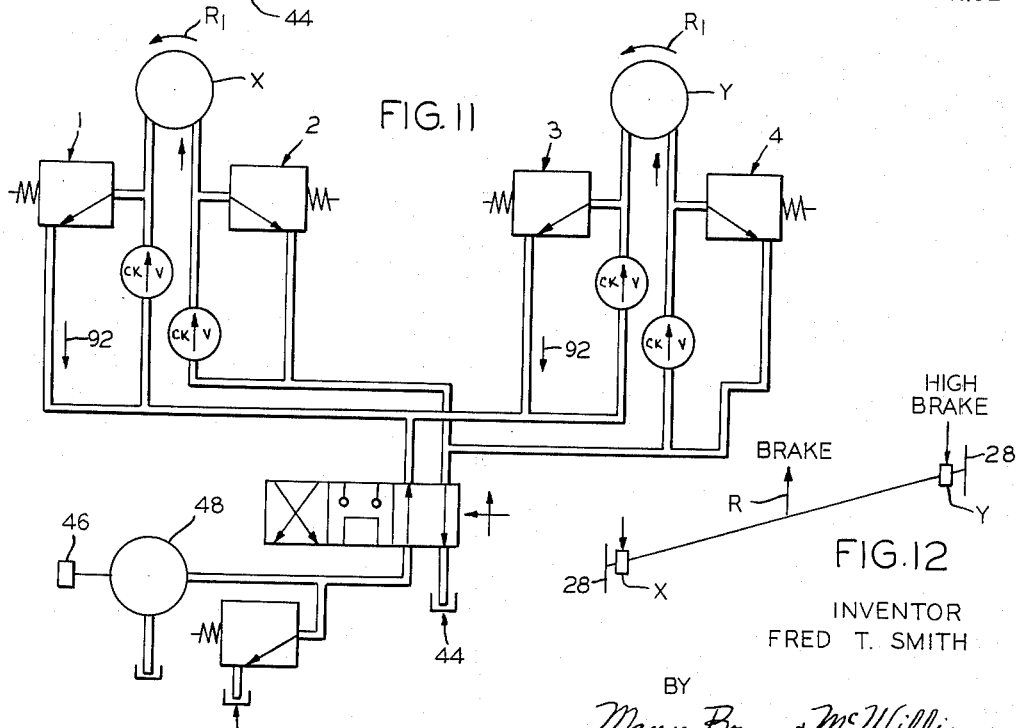
INVENTOR
FRED T. SMITH
BY
*Mann, Brown & McWilliams*
ATTORNEYS Sept. 7, 1965  F. T. SMITH  3,204,577
OVERHEAD CRANE WITH SKEW CONTROL
Filed June 23, 1960  11 Sheets-Sheet 5

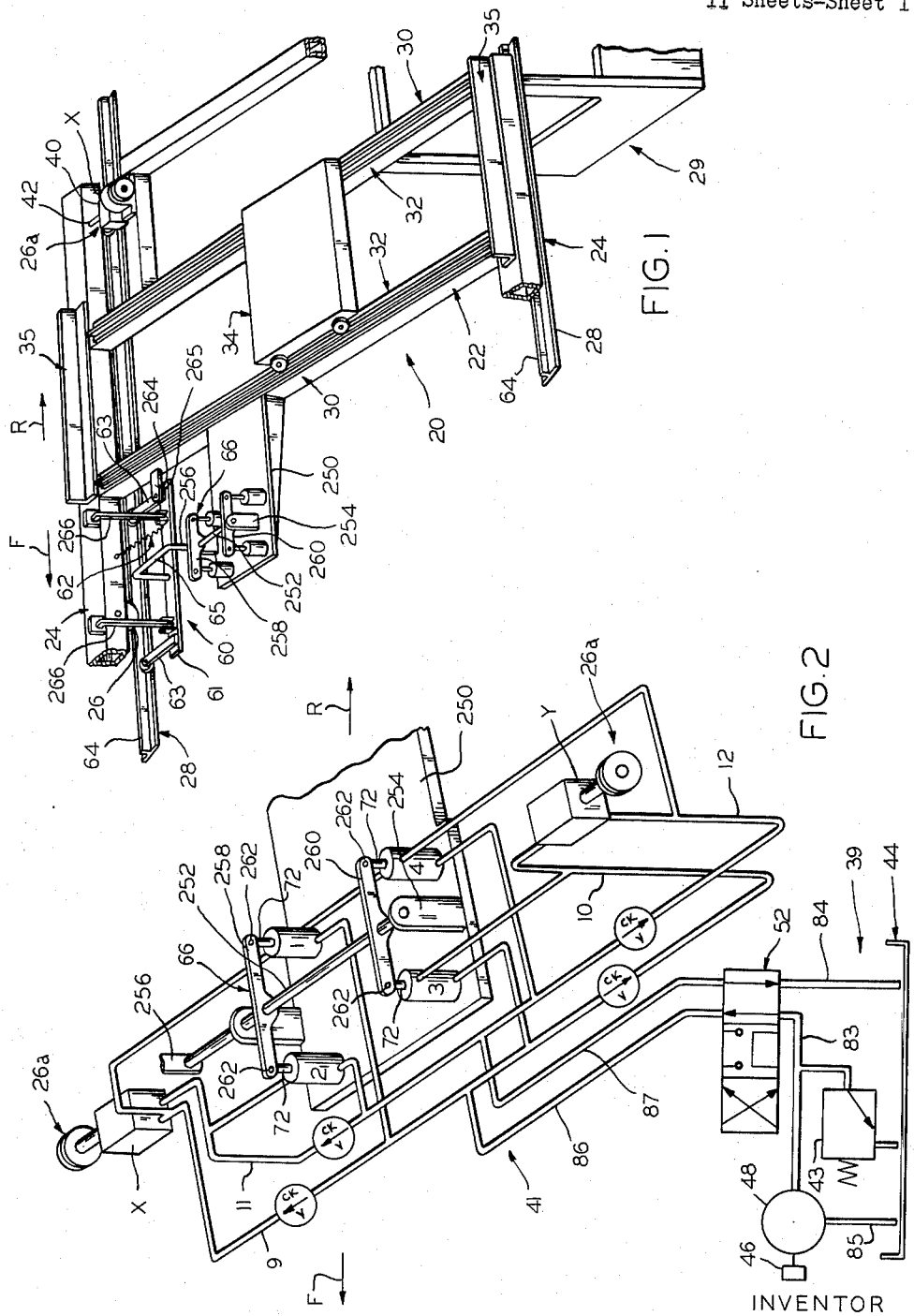

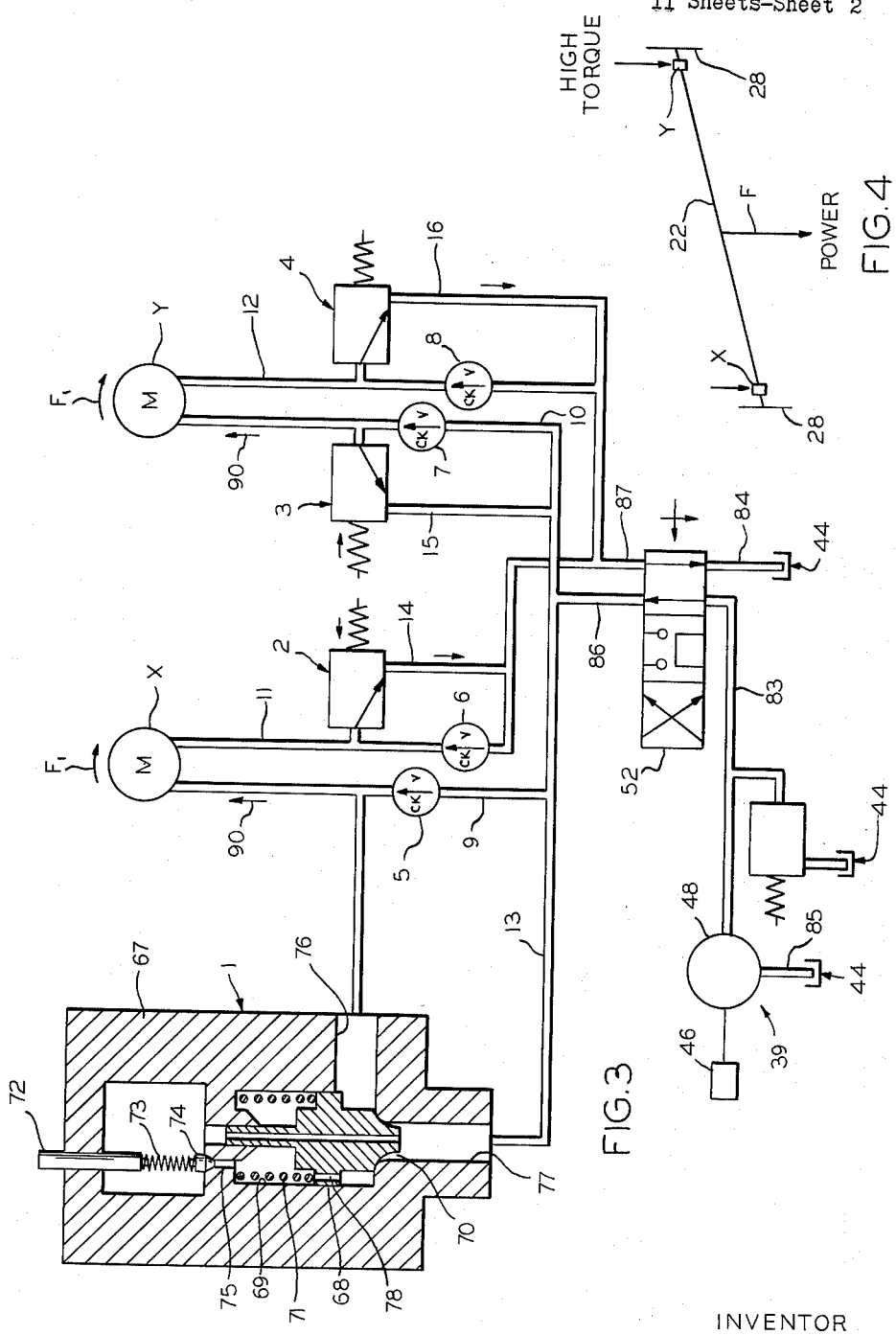

INVENTOR
FRED T. SMITH
BY
Mann, Brown & McWilliams
ATTORNEYS

Sept. 7, 1965 F. T. SMITH 3,204,577
OVERHEAD CRANE WITH SKEW CONTROL
Filed June 23, 1960 11 Sheets-Sheet 6

*INVENTOR.*
FRED T. SMITH
BY
Mann, Brown + McWilliams
ATTORNEYS

Sept. 7, 1965 F. T. SMITH 3,204,577
OVERHEAD CRANE WITH SKEW CONTROL
Filed June 23, 1960 11 Sheets-Sheet 7
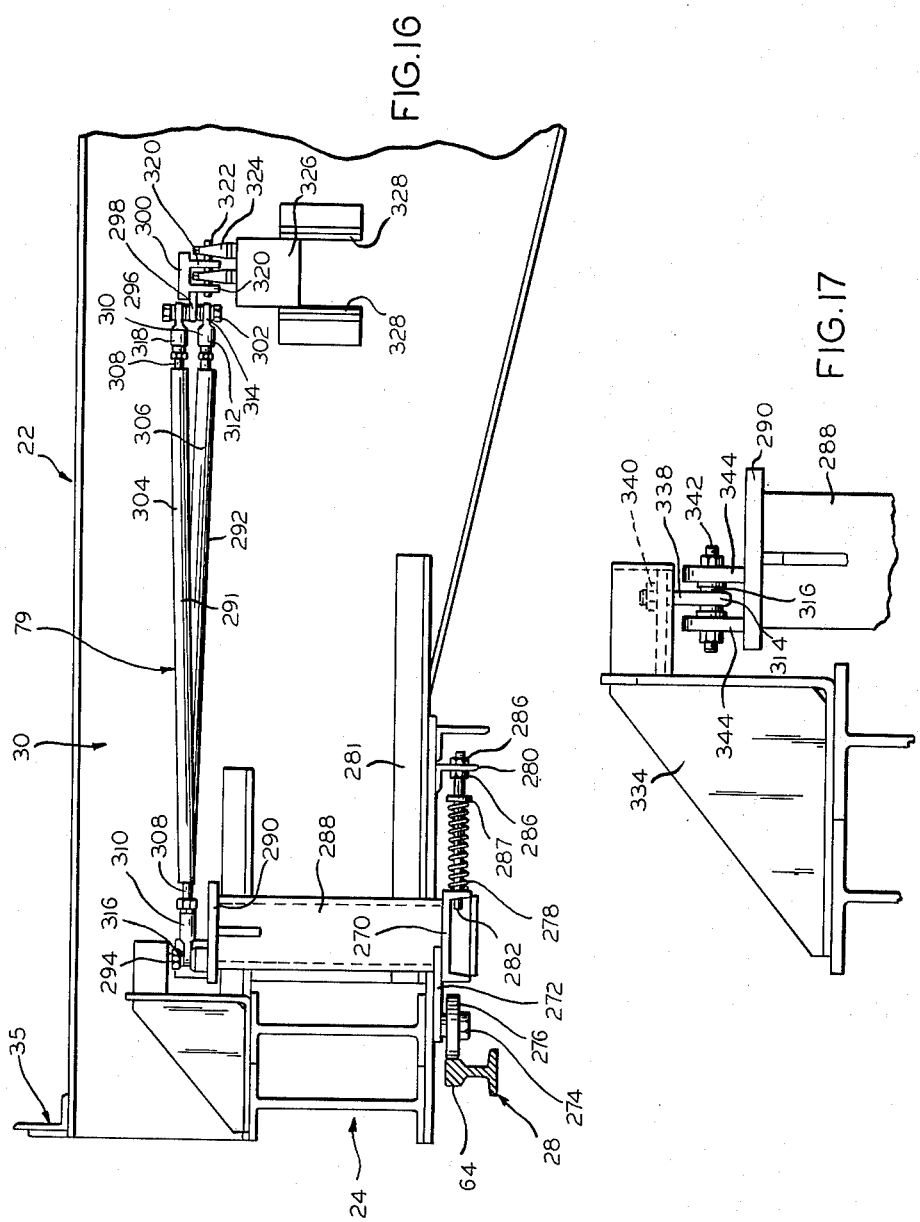
INVENTOR.
FRED T. SMITH
BY
Mann, Brown + McWilliams
ATTORNEYS Sept. 7, 1965  F. T. SMITH  3,204,577
OVERHEAD CRANE WITH SKEW CONTROL
Filed June 23, 1960  11 Sheets-Sheet 8
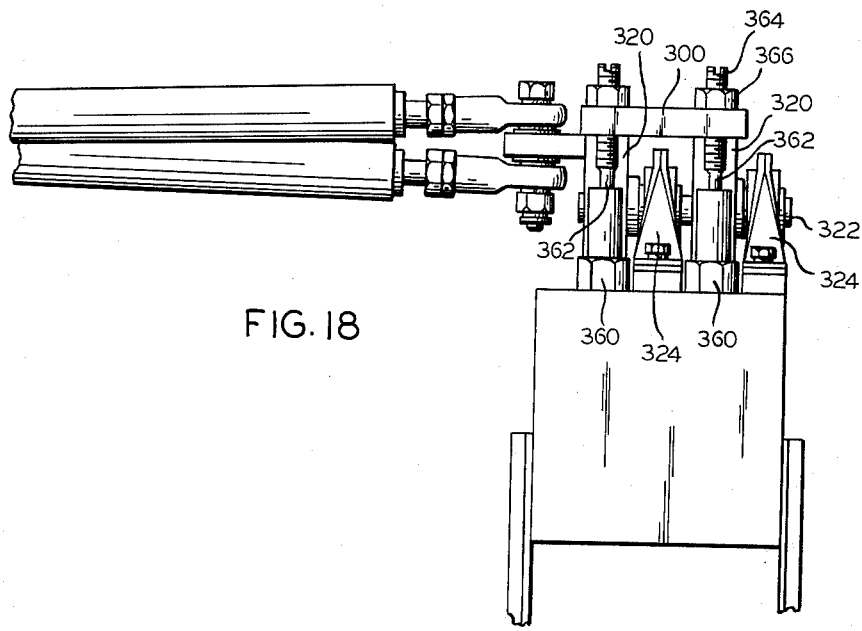
FIG. 18
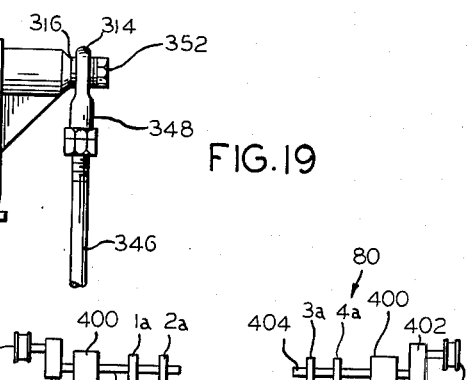
FIG. 19
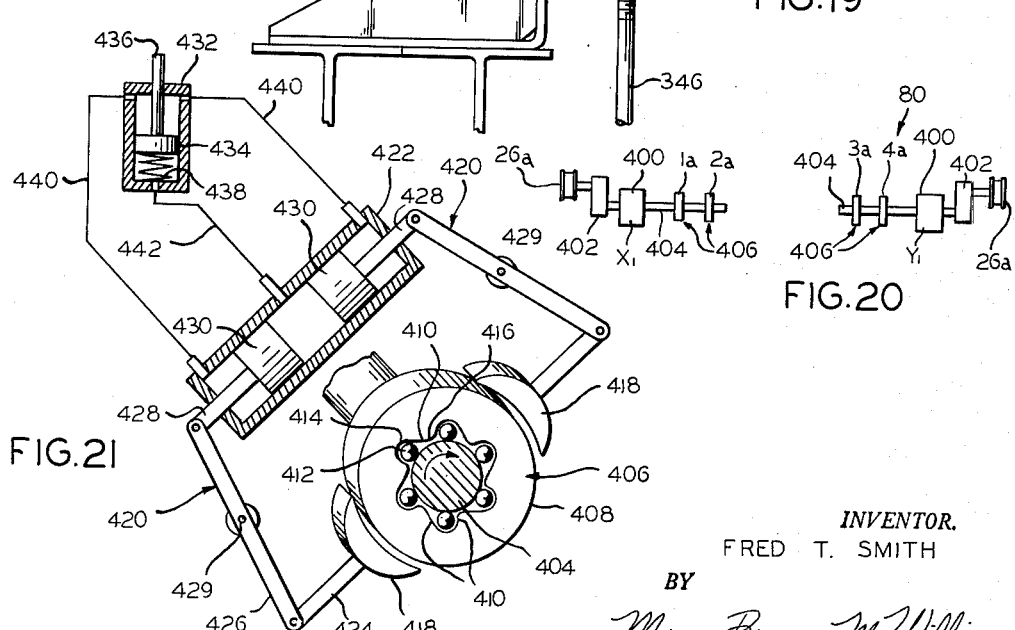
FIG. 20
FIG. 21
INVENTOR.
FRED T. SMITH
BY
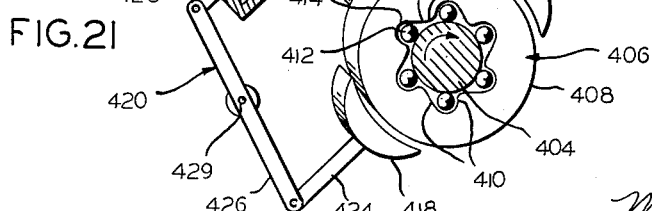
ATTORNEYS

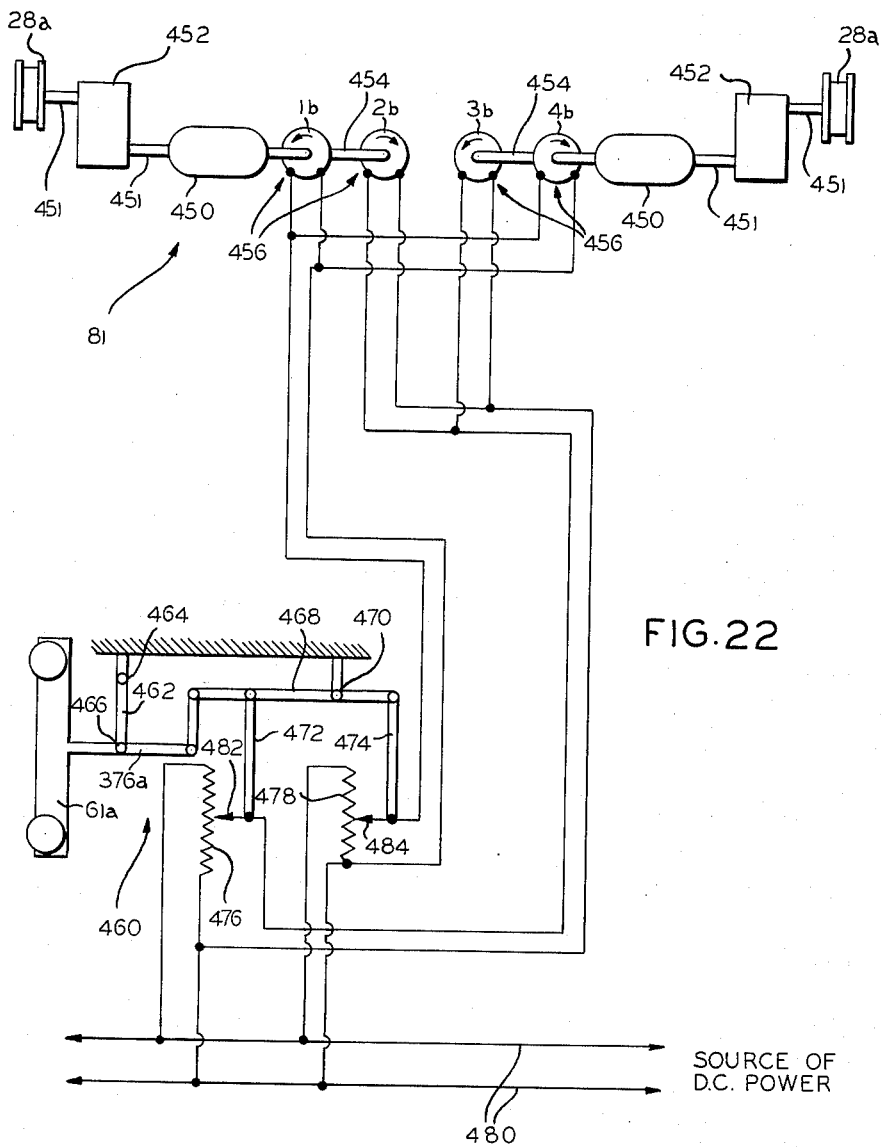

Sept. 7, 1965
F. T. SMITH
3,204,577
OVERHEAD CRANE WITH SKEW CONTROL
Filed June 23, 1960
11 Sheets-Sheet 10
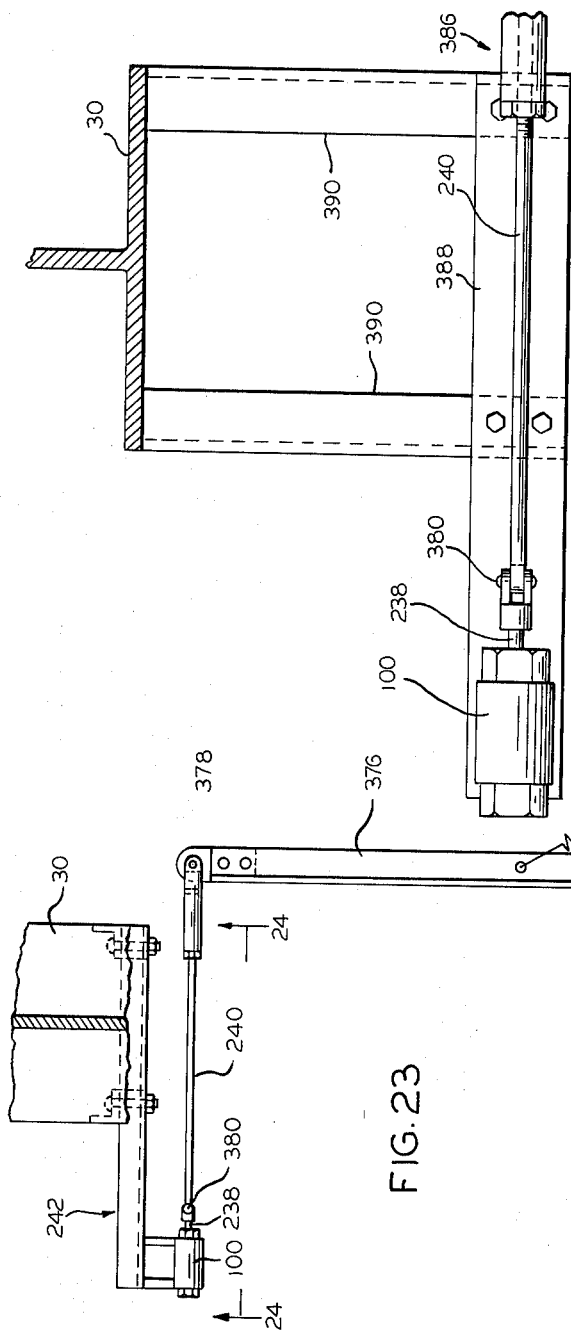
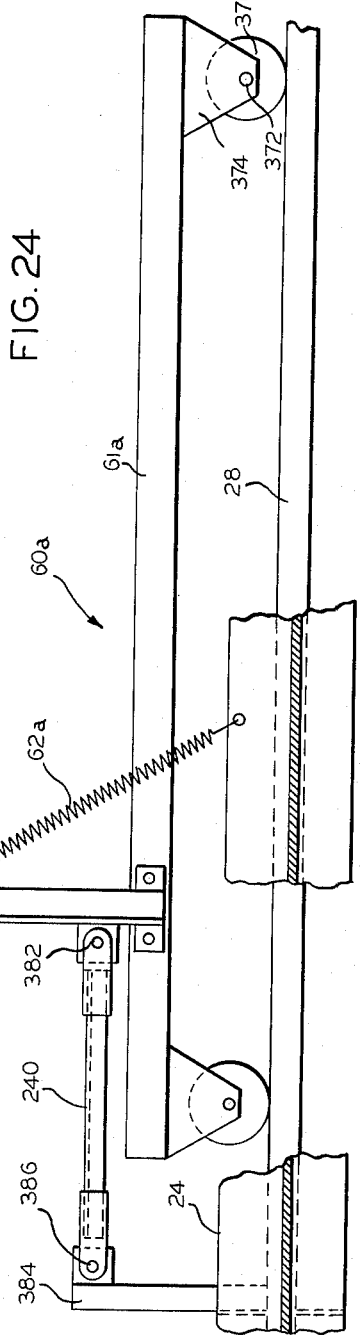
INVENTOR.
FRED T. SMITH
BY
Mann, Brown & McWilliams
ATTORNEYS

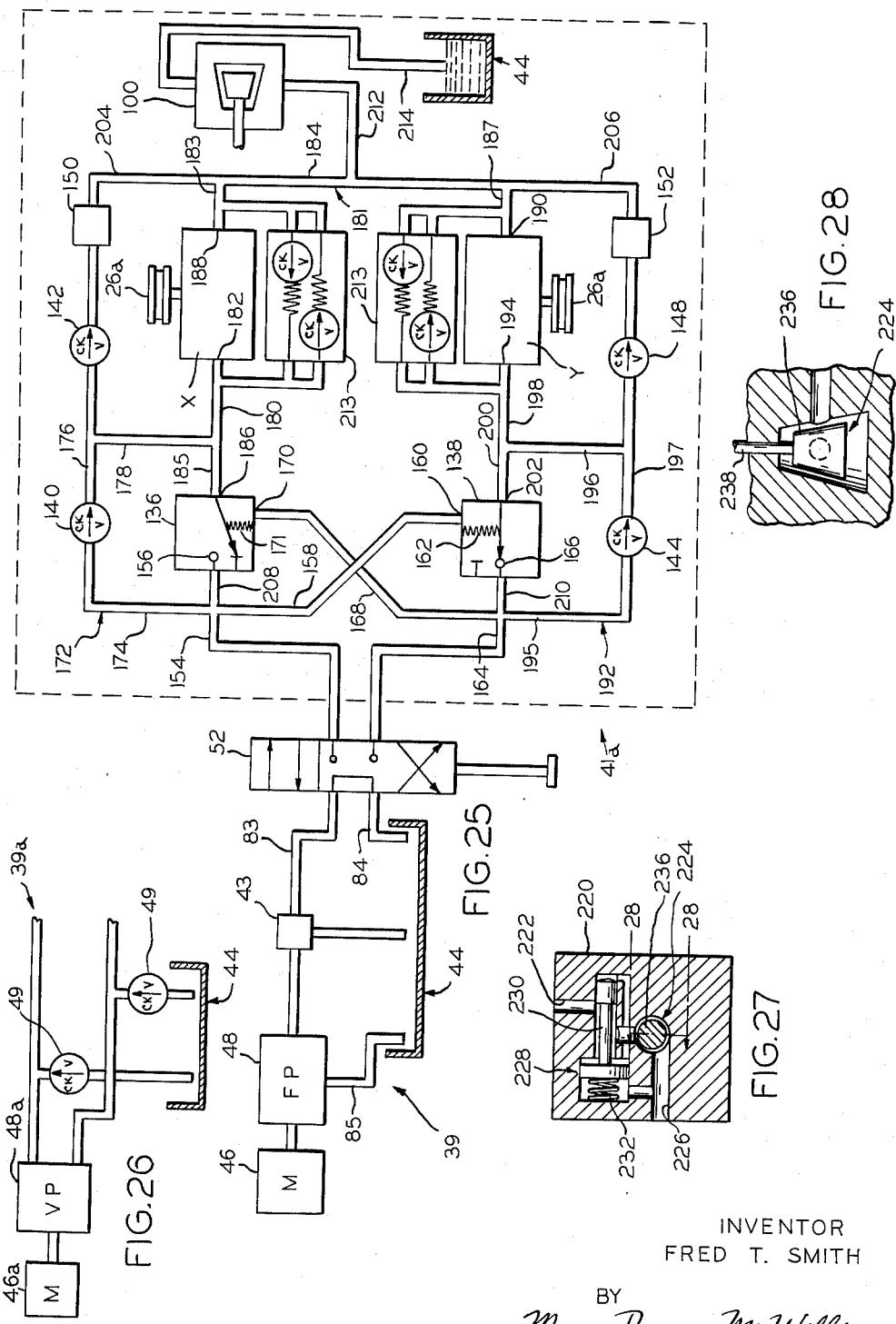

United States Patent Office 3,204,577
Patented Sept. 7, 1965

3,204,577
OVERHEAD CRANE WITH SKEW CONTROL
Fred T. Smith, Olympia Fields, Ill., assignor to Whiting Corporation, a corporation of Illinois
Filed June 23, 1960, Ser. No. 38,241
23 Claims. (Cl. 105—163)

My invention relates to an overhead crane with skew control, and more particularly, to hydraulic and other driving systems for effectively controlling the movement of the crane bridge along its trackway and is a continuation-in-part of my copending application Serial No. 765,847, filed October 7, 1958.

Overhead cranes conventionally include a bridge structure that employs girders extending between trucks which ride on spaced runway or trackway rails mounted above the area that the crane is to move over. The bridge in turn carries track rails that extend longitudinally of the bridge and transversely of the runway, on which operates the crane trolley that actually carries the crane hoist apparatus.

Apparatus for moving the bridge of a conventional overhead crane along its runway conventionally includes and requires a squaring shaft that extends between the crane trucks and solidly connects like wheels of the truck so that the crane bridges will not skew as it moves down its runway. The bridge is actuated by employing a variable speed electric motor coupled to the shaft by a gear train, couplings, and the like. As the shaft must be virtually the full span of the girder, and the numerous gears, bearings, couplings and the like must be carefully assembled, manufacturing costs are unduly high due to the expensive materials and large amount of assembly time required.

A principal object of my invention is to provide apparatus for moving the bridge of overhead cranes along its runway which eliminates this squaring shaft together with its gear train, bearings and variable speed electric motor, while at the same time providing perfect control over movement of the bridge and insuring that the bridge remains square with its runway.

Another principal object of my invention is to provide an overhead crane employing a synchronizing motor control arrangement for driving the trucks at either end of the crane bridge, thereby eliminating the need for the conventional squaring shaft.

A further principal object of the invention is to provide an overhead crane in which the bridge is actuated by hydraulic motors that are operationally controlled to prevent skewing of the bridge with respect to its trackway or runway.

Still another principal object of the invention is to provide a bridge drive control system for overhead cranes which insures complete and continuous control at all times over movement of the crane regardless of the load carried by it or the skill of the operator, and all without having to introduce into the bridge drive system supplemental drive energy just for skew control purposes.

Other objects of the invention are to provide crane bridge movement control devices that are arranged to accommodate structural and operational requirements that are peculiar to overhead cranes, to provide methods of and hydraulic circuits for crane operation which are adapted to replace conventional crane bridge drive arrangements without other material alteration of the crane, and to provide overhead crane arrangements which effect material reductions in manufacturing and installation costs, which may be operated with facility by inexperienced operators, and which may be readily applied to existing overhead crane installations.

Further objects, uses and advantages of the invention will become obvious or be apparent from a consideration of the following detailed description and the application drawings.

In the drawings:

FIGURE 1 is a diagrammatic perspective view of an overhead crane arranged in accordance with my invention, with the crane structure being largely shown in block diagram form and illustrating a preferred hydraulic drive arrangement for the crane bridge;

FIGURE 2 is a diagrammatic view, partially in perspective, illustrating the hydraulic circuiting and associated apparatus employed in the embodiment of FIGURE 1;

FIGURE 3 is a schematic diagram of the hydraulic circuiting shown in FIGURE 2, with one of the control valves thereof shown in section on an enlarged scale to better depict the essential characteristics thereof, and also showing one condition of operation of the overhead crane of FIGURE 1;

FIGURE 4 is a diagrammatic representation of one crane skew position which is avoided by the circuiting of FIGURES 2 and 3 when the crane is operating under power conditions in the direction of arrows F and $F_1$ in FIGURES 1–3, with the respective hydraulic motors being diagrammatically located for description purposes;

FIGURE 5 is similar to FIGURE 3, again showing crane bridge operation in the direction of arrow F of FIGURE 1 under power conditions;

Figure 13:
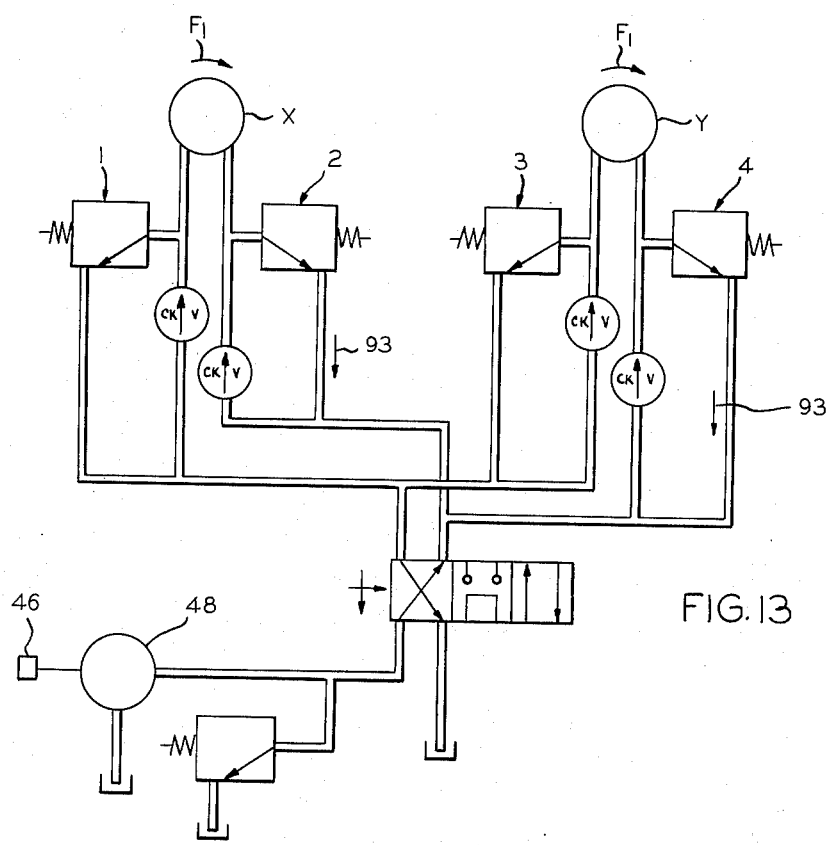
Figure 14:
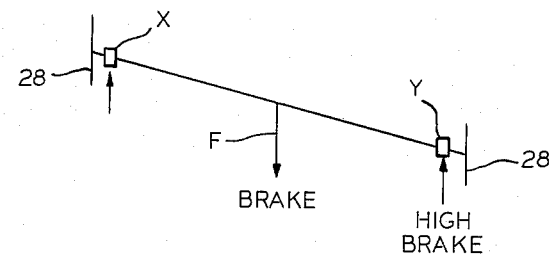
Figure 15:
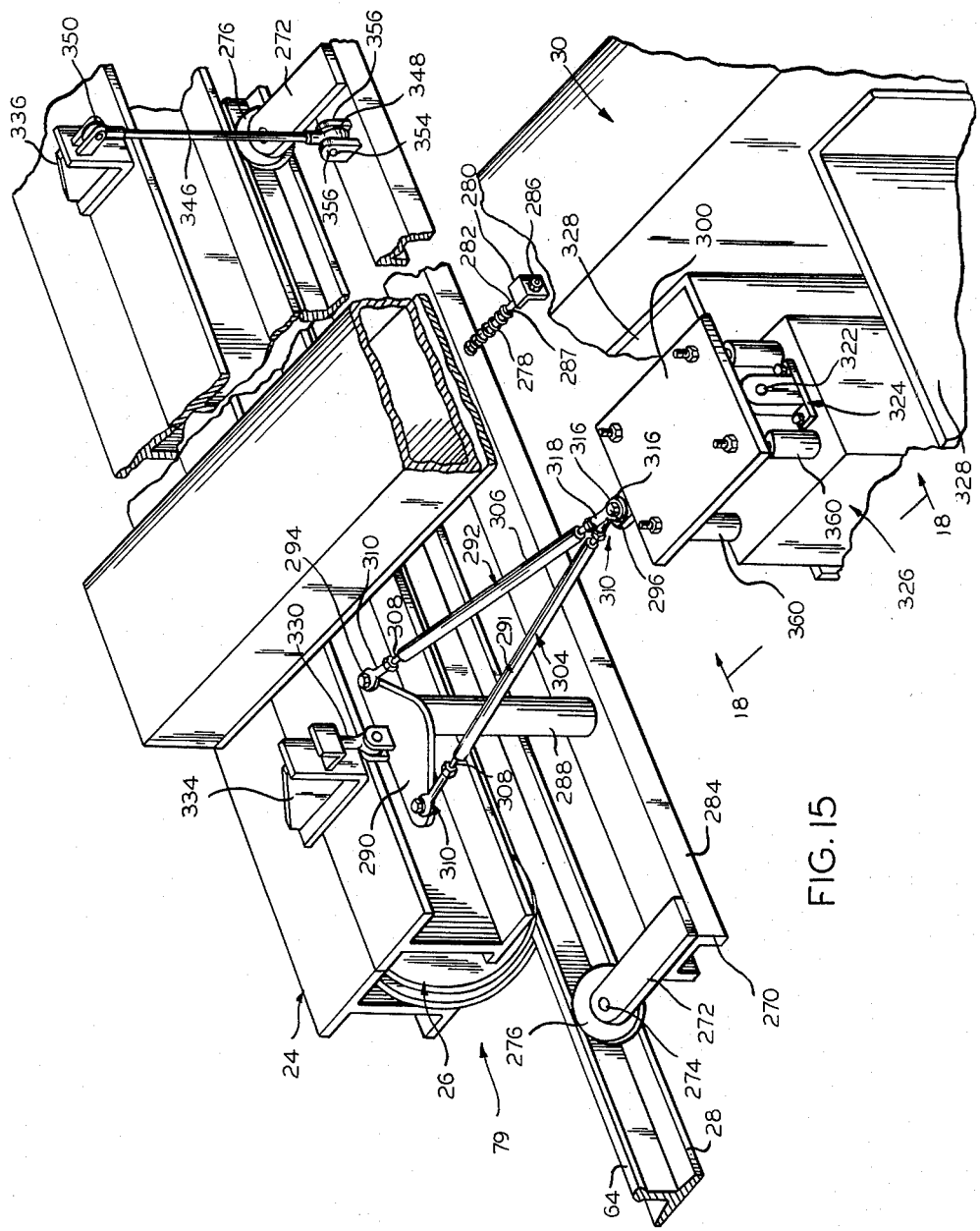

FIGURE 6 indicates the second skew condition which is eliminated by the hydraulic system of FIGURE 2 when the crane is operated as indicated by the arrows of 3 and 5;

FIGURE 7 is a view similar to that of FIGURE 5, but showing the condition of the hydraulic system when the direction of movement of the bridge is as indicated by the arrow R of FIGURES 1 and 2;

FIGURE 8 is a view similar to FIGURES 4 and 6, but illustrating the crane bridge skew condition eliminated when the crane bridge is operating under the power conditions indicated by FIGURE 7;

FIGURE 9 is similar to FIGURE 7;

FIGURE 10 is similar to FIGURE 8, but illustrates the crane bridge skew position eliminated by the hydraulic circuiting of FIGURE 2 when the crane bridge is operating under the power conditions illustrated by FIGURES 7 and 9;

FIGURE 11 is similar to FIGURES 3 and 5, but illustrates the direction of fluid flow through the hydraulic system of FIGURE 2 under crane bridge braking conditions in the direction of arrow R of FIGURES 1 and 2;

FIGURE 12 is a view similar to FIGURE 10, but illustrating the crane bridge skewing condition eliminated under the bridge braking condition of FIGURE 11;

FIGURE 13 is similar to FIGURE 11, but shows the direction of hydraulic liquid flow through the system of FIGURE 2 when the crane is being braked or moving in the direction of arrow F of FIGURE 1;

FIGURE 14 is a view similar to FIGURE 12 illustrating the crane bridge skew condition that is eliminated during the operation of the crane bridge depicted by FIGURE 13;

FIGURE 15 is a fragmental perspective view of a specific form of crane bridge structure and one truck thereof, illustrating a preferred specific embodiment of a squaring control or sensing device that may be employed in connection with the hydraulic circuiting depicted by FIGURE 2;

FIGURE 16 is a front elevational view of the structure shown in FIGURE 15;

FIGURE 17 is a fragmental elevational view depicting one of the squaring control truck supports employed in the embodiment of FIGURE 15;

FIGURE 18 is a view substantially along line 18—18 of FIGURE 15, illustrating the manner in which the hydraulic control components of this invention are actuated by the arrangement of FIGURE 15;

FIGURE 19 is a view similar to that of FIGURE 17 but depicting the other squaring control support shown in FIGURE 15;

FIGURE 20 is a small scale diagrammatic representation of a modified form of crane bridge drive employing suitable hydraulic or electric motors for actuating disjunctively related drive wheels in accordance with this invention;

FIGURE 21 is a diagrammatic view, partially in perspective, depicting the manner in which the drive arrangement of FIGURE 20 may be arranged to overcome the skewing tendencies illustrated by FIGURES 3–14;

FIGURE 22 is a diagrammatic representation of a further form of bridge drive in accordance with this invention employing an electrical sensing and motor control arrangement for overcoming the bridge skew movements already illustrated;

FIGURE 23 is a plan view of a further modified form of skew control arrangement in accordance with this invention;

FIGURE 24 is an elevational view, partially in section, approximately along line 24—24 of FIGURE 23;

FIGURE 25 is a diagrammatic view schematically illustrating a further form of synchronizing motor control circuit (shown within the area enclosed by the dashed lines), together with an appropriate directional and speed control hydraulic circuit for actuating the synchronizing circuit, which may be employed together, for instance, with the squaring control device of FIGURE 23 for controlling the movements of the crane bridge of FIGURE 1;

FIGURE 26 illustrates a simplified directional and speed control circuit that may be substituted for that shown in FIGURES 2 and 25;

FIGURE 27 is a diagramamtaic cross-sectional view illustrating a flow control valve that may be employed as part of the hydraulic circuit of FIGURE 25; and FIGURE 28 is a diagrammatic fragmental cross-sectional view along line 28—28 of FIGURE 27.

*General description*

Reference numeral 20 of FIGURE 1 generally indicates an overhead crane in which the principles of my invention have been embodied. Crane 20 includes the familiar bridge 22 fixed between trucks 24 that employ double flanged wheels 26 and 26a which ride along the spaced rails 28. The rails 28 are supported in any suitable manner along the area over which the crane 20 is to operate and define the trackway or runway of the crane bridge.

The bridge 22 includes the usual girders 30, which are only diagrammatically illustrated in FIGURE 1, that carry the operator's cage 29 and on which rails 32 are mounted that form the runway for trolley 34 that is shown only diagramamtically and which customarily carries the crane hoisting equipment (not shown). Suitable trolley stops 35 are conventionally provided at the ends of rails 32 to limit the movement of the trolley longitudinally of the bridge.

As previously mentioned, cranes of the type shown in FIGURE 1 ordinarily include a squaring shaft that extends between the trucks of the crane and fixedly unites the driving wheels thereof, such as the driving wheels 26a (only one of which is shown in FIGURE 1). The squaring shaft acts in a manner similar to the solid axle employed in railroad car wheels and forms a solid torque connection between the two trucks so that the bridge wheels will revolve at the same rate; this shaft is also supposed to hold the bridge perpendicular with respect to the rails 28 as the bridge moves down its runway. Conventional overhead crane bridges are actuated by turning this shaft through a gear train that is in turn powered by a variable speed electric motor. Braking is achieved in cab operated cranes by employing a foot operated friction brake closely resembling the automotive type, while in floor controlled cranes, friction type brakes are electrically controlled from the floor, which usually precludes the desired sensitivity of control.

The so-called conventional squaring shaft in practice is objectionable from a number of different standpoints in addition to the excessive installation and maintenance costs already mentioned. For instance, where the bridge once becomes skewed by a bridge wheel slipping on a grease spot, the rigidity of the shaft will tend to maintain the bridge in the skewed position. Also, there can be no compensation for differences in bridge wheel diameter in spite of the fact that it is very seldom that two wheels of a crane bridge are of the same diameter; thus, the end of the bridge having the larger squaring shaft wheel will lead the other end of the bridge as the shaft wheels are driven by the squaring shaft, and consequently skewing will be caused by the bridge drive itself.

In accordance with my invention, the squaring shaft is eliminated and the thus disjunctively related and spaced drive wheels, for instance, wheels 26a, are driven by separate hydraulic motors X and Y with no other connection between them (see FIGURE 2). The motors X and Y are incorporated in a squaring control motor drive system formed by the synchronizing hydraulic motor control circuit 41 of FIGURE 2, which is, together with a bridge skew detecting device 60, designed to synchronize the operation of motors X and Y and thereby prevent any tendency of the bridge to skew even though the conventional squaring shaft has been eliminated. A suitable directional and speed control circuit 39 may be employed to operate circuit 41 and such circuit 39 may include a tank 44 forming a reservoir for hydraulic liquid, a continuously operating fixed volume pump 48 for supplying hydraulic liquid from tank 44 to hand operated four way control valve 52 through a relief valve 43. Hand control valve 52 is manually positioned to achieve the speed and direction desired.

Pump 48 may be operated by any suitable type of motor such as a constant speed continuous duty A.C. squirrel cage type electric motor 46 (see FIGURE 2).

The four way control valve 52 operates in a conventional manner to control the direction of flow of the hydraulic liquid to the synchronizing control circuit 41 and thus the direction of rotation of motors X and Y.

In accordance with the invention embodiments of FIGURES 1–19, the synchronizing circuit 41 includes variable orifice valve devices in the form of pressure relief valves indicated by reference numerals 1, 2, 3 and 4, which are employed to affect the operation of motors X and Y as required to keep the bridge from skewing as it moves down its runway without requiring the need of a separate motor or engine for skew control purposes, which makes the circuit 41 a squaring control device of the non-energy introducing type (meaning that the driving energy of the motor system is not supplemented for skew control purposes). The operation of valves 1–4 is dictated by the bridge skew sensitive, skew detecting, or sensing device arrangement generally indicated by reference numeral 60 of FIGURE 1, which is provided to detect skewing of the bridge and generally comprises an elongate truing or datum arm 61 carried by one of the crane trucks and held in parallel relation with the adjacent rail 28 by a suitable spring 62 holding wheeled projections 63, of identical lengths, against the head 64 of the rail. The arm or member 61 carries a link 65 which is pivotally connected to a rocker member 66 which operatively engages the respective valves 1–4 in the manner suggested by FIGURES 1 and 2.

The valves 1–4 may each be of any suitable variable orifice type but preferably they assume the form of a more or less conventional pilot operated relief valve, which involves structure similar to that depicted in FIGURE 3 including a suitable housing 67, a balanced piston 68 reciprocably mounted in a suitable cavity 69 and biased against valve seat 70 by a suitable compression spring 71, and a plunger 72 slidably mounted in housing 67 and engaging compression spring 73 which also bears against plug member 74 that is adapted to close off housing passage 75.

The form of pilot operated relief valve illustrated customarily operates by hydraulic liquid under pressure entering inlet 76 and since the areas on both sides of piston 68 are equal, the piston 68 will be lifted upwardly to permit hydraulic liquid to be discharged from outlet 77. Piston 68 is formed with a passage 78 through which hydraulic liquid under pressure passes to lift plug 74, and the amount of hydraulic liquid permitted to pass piston 68 depends upon the amount of compression that is applied to spring 73. Thus, upon depressing plunger 72, a greater compression is applied to spring 73 which requires a higher pressure hydraulic liquid acting against piston 68 to lift piston 68 off its valve seat 70. As long as plunger 72 remains depressed from any arbitrary neutral position, the flow of hydraulic liquid through the relief valve will be restricted or reduced below that at the neutral position of plunger 72.

In accordance with this invention, the valves 1–4 are incorporated in the motor synchronizing circuit 41 in the manner indicated in FIGURE 3 together with check valves 5, 6, 7 and 8 of any appropriate form. The check valves 5 and 7 are interposed in what may be termed supply conduits 9 and 10 leading from four way control valve 52 while the check valves 6 and 8 are interposed in what may be termed return conduits 11 and 12 that also are connected to the four way control valve 52 in the manner indicated in FIGURE 3. The check valves 5–8 block liquid flow from motors X and Y. The respective relief valves 1–4 are connected across the respective check valves by appropriate shunt conduits 13, 14, 15 and 16, and their operation is controlled, as crane 20 moves along its runway, by the squaring control or sensing device 60.

FIGURES 15–19 illustrate a specific form 79 of squaring control bridge drive system of the type diagrammatically illustrated in FIGURES 1 and 2, while FIGURES 20–22 illustrate drive systems 80 and 81 which include squaring control arrangements that effect the same controlling action on the crane bridge, but may or may not employ hydraulic motors for driving same.

FIGURES 23–28 illustrate the hydraulic squaring control drive system disclosed in my above mentioned copending application Serial No. 765,847, filed October 7, 1958, now Patent No. 2,984,191, granted May 16, 1961, of which this application is a continuation-in-part, and the disclosure of which is hereby incorporated herein by this reference insofar as it is not inconsistent with the disclosure of the present application.

In operating the arrangements illustrated in FIGURES 1–19, the crane operator starts up operation of the motor 46 and pump 48 at the beginning of the work day, and they continuously operate during the period that the overhead crane is in use. Hand control four way valve 52, which is customarily mounted in the operator's cage 29, is manually positioned to achieve the speed and direction desired, relief valve 43 returning unneeded hydraulic liquid to reservoir 44. The sensing device or squaring control 60 and synchronizing circuit 41 during operation of the crane operate automatically, when the bridge 22 moves along its runway, to prevent any tendency of the bridge to skew, whether the bridge is being accelerated down its runway, driven at uniform speed, or braked.

The embodiments of FIGURES 20–28 achieve like results when operated as hereinafter more specifically described.

*The hydraulic motors for bridge*

Hydraulic motors X and Y in the embodiment of FIGURES 1–19 may be of any conventional positive displacement type suitable for the purpose, though that described in my copending application Serial No. 710,452, filed January 22, 1958, now Patent No. 3,046,950, granted July 31, 1962 is especially adapted for use in connection with hydraulic cranes as it provides a uniform torque output over its cycle of operation, and furthermore, is capable of providing high torque at low speed regardless of whether the motor operates in a forward or reverse direction. Consequently, the motor of my application Serial No. 710,452 serves as a drive unit having stepless speed control and is capable of moving heavy loads at low speeds without pulsation and is preferred for use in connection with crane 20 either as motor X or as motor Y (which motors are assumed to be identical in construction).

Motors X and Y are mounted in any suitable manner on the crane and drive the respective wheels 26a through appropriate gear reducers 40 that are coupled to the shafts 42 of wheels 26a in any suitable manner.

No further description of motors X and Y or gear reducer 40 is believed necessary since any suitable hydraulic motor structure and drive connection with wheels 26a will be satisfactory for purposes of this invention.

*Hydraulic drive circuiting and operation of same*

Referring again to the embodiment of FIGURES 1–19, the continuously operating positive displacement pump 48 (of directional and speed control circuit 39) may be of any conventional type and may be driven by appropriate motor 46 through any suitable coupling (not shown) and supplies hydraulic liquid under pressure to the four way control valve 52 through conduiting 83 with which a conventional relief valve 43 is connected. Conduit 83 is appropriately connected to four way control valve 52, as is discharge conduit 84 which returns the hydraulic liquid to tank 44. Pump 48 draws hydraulic liquid from tank 44 by appropriate conduit 85.

In the specific hydraulic system illustrated in FIGURES 2 and 3, supply conduits 9 and 10 are connected to a common supply conduit 86 while return conduits 11 and 12 are connected to common return conduits 87, thus connecting motors X and Y in parallel in the hydraulic circuit. Of course, the conduits termed "supply conduits" and the conduits termed "return conduits" have reversed functions when the direction of operation of the motors is reversed by appropriate manipulation of four way control valve 52, as will be obvious to those skilled in the art.

In accordance with this embodiment of the invention, the synchronizing circuit 41 is so arranged and the relief valves 1–4 are so positioned with respect to bridge skew sensitive detecting device 60 that in the event of a skewing action, the hydraulic motor X or Y on the side of the bridge tending to lead in the direction of movement of the bridge is operated so that its torque output is reduced in accordance with that required to restore the bridge to its normal right angled positioning across the trackway defined by rails 28. Consequently, the hydraulic motor at the trailing end of the bridge is temporarily made the high torque motor of the crane.

Furthermore, the valves 1–4 are arranged in association with the bridge skew sensitive detecting device 60 so that skew correction will be effected on the bridge regardless of whether the bridge is moving in the forward or reverse directions indicated by arrows F and R, respectively, and whether the bridge is moving under power, coasting, or being braked while moving in such directions (as may happen either where it is desired to halt the bridge or suddenly reverse its direction). This is achieved in the embodiment of FIGURES 1–19 by positioning the valves 1–4 with respect to rocker member 66 of device 60 so that the valves on the supply and return conduits of the individual motors are actuated in opposite directions, and further, the valve of the motor that will be leading in any particular position of skew will be operated to make that motor the low torque motor of the bridge in the degree required to overcome any skewing tendency.

For instance, the skew condition of FIGURE 4 contemplates the movement of bridge 22 in the direction F with motor X tending to lead the bridge down the trackway, this being under acceleration or uniform velocity conditions as indicated by the word "power" in FIGURE 4. For this condition of operation, it is assumed that the arrows 90 of FIGURE 3 indicate the direction of movement of hydraulic liquid through conduits 86, 87 and 9–12. Since motor X is the motor to be corrected in accordance with this embodiment, it is the valve 2 that must be actuated to restrict liquid flow from motor X and this is done by depressing plunger 72 of valve 2 the amount required to reduce the effective torque output of motor X as is necessary to overcome the tendency to skew. Valve 2 is thus positioned with respect to skew detecting device 60 so that its plunger 72 will be depressed when the crane bridge tends to skew in the manner indicated in FIGURE 4, thereby in effect increasing the back pressure effective against motor X and reducing the pressure drop across this motor.

The remainder of the valves 1–4 are similarly associated with device 60 and in particular its rocker member 66, resulting in the relative positioning indicated in FIGURE 2.

It will therefore be seen that when the skewing condition of FIGURE 4 occurs, under the operating conditions of FIGURE 4, motors X and Y will be turning in the direction of arrows $F_1$ and hydraulic liquid will be proceeding through supply conduit lines 9 and 10, past check valves 5 and 7, through the respective motors X and Y and thence through the respective relief valves 2 and 4 (which are shown symbolically in FIGURE 3) after which the hydraulic liquid returns to tank through four way control valve 52. The check valves 6 and 8, of course, block hydraulic liquid flow downstream of return conduits 11 and 12, thus directing the liquid flow through valves 2 and 4, respectively. On the supply side of the motors, the valves 1 and 3 will be closed because hydraulic liquid is under substantially equal pressure in their inlets and outlets 76 and 77.

Under these conditions (when employing variable orifice valves of the type shown in FIGURE 3 as valves 1–4), plunger 72 of valve 2 is being depressed by rocker member 66, while the plunger 72 of valve 4 is permitted to rise a corresponding amount due to the biasing action of its spring 73. Thus, the restrictive action of the valve 4 on the liquid flow from motor Y is reduced an amount corresponding to the increased flow restriction dictated by valve 2 because of the depression of its plunger 72, and, of course, the pressure drop across motor Y will be increased an amount corresponding to the decrease in pressure drop arcoss motor X, with consequent like variance of the torque output of motor Y.

It may be added that this inverse effect of the respective valves 1–4 on actuation by rocker member 66 obtains because of the specific nature of the pilot operated relief valve shown in FIGURE 3. However, there are pilot operated relief valves of standard designs in which the plunger 72 is held from rising above the aforementioned arbitrary vertical position (as by employing a suitable stop arrangement that limits the outward movement of plunger 72) and where relief valves of this type are employed as valves 1–4, the objects of the invention are obtained by arranging such valves so that the pressure drop across the motor tending to lead under skewing tendencies is reduced, making this motor the low torque motor. Alternately, these valves may be arranged so that only the pressure drop across the motor at the lagging end of the bridge is affected (it should be increased), so as to make the motor at the leading end of the bridge the low torque motor, as will now be apparent to those skilled in the art.

FIGURES 5–14 illustrate many of the remaining possible conditions of skew and the corresponding operation conditions of the hydraulic synchronizing circuit 41, and FIGURES 5 and 6, 7 and 8, 9 and 10, 11 and 12, and 13 and 14, should be considered in pairs since they have the same corresponding relation that FIGURES 3 and 4 have. Parenthetically, it may be mentioned that in the showing of FIGURE 4 and similar figures the relative lengths of the unnumbered arrows indicate the low and high torque (or braking) motors when skew is being corrected and the directional arrows F and R, respectively, indicate the same directions of movement relative to the trackway as the arrows F and R of FIGURES 1 and 2; furthermore, the description pertaining to these figures is made with reference to the specific pilot operated relief valve shown in FIGURE 3, and it will be obvious to those skilled in the art how the alternate valves mentioned immediately above will function without specifically describing same.

Thus, FIGURE 6 illustrates the second possible condition of skew when the crane is moving in the direction F under power conditions, in which motor Y tends to lead. The circulation of hydraulic liquid through synchronizing circuit 41 under this condition of operation is shown in FIGURE 5, which is identical with that of FIGURE 3 as indicated by the arrows. However, under this condition of skew, the plunger 72 of valve 4 is depressed, which renders motor Y the low torque motor in the proportion required to overcome the tendency to skew.

FIGURE 8 illustrates one of the possible positions of skew when the bridge is moving in the direction R under power conditions, with the hydraulic liquid flow through the synchronizing circuit 41 being that indicated by the arrows 91; the direction of rotation of motors X and Y is indicated by arrows $R_1$. Since in accordance with this embodiment of the invention, it is the relief valve on the return side of the leading motor that is operated to make the leading motor a lower torque motor, valve 3 is positioned with respect to rocker arm 66 to have its plunger 72 depressed when the bridge assumes the positioning of FIGURE 8 in the direction of movement indicated by FIGURE 8.

FIGURE 10 illustrates the other possible skewing action of bridge 22 in the direction of movement indicated by arrow R under power conditions, in which the hydraulic liquid flow through synchronizing circuit 41 is indicated by arrows 91 in FIGURE 9. Since the motor X is the leading motor in this position of skew, the valve 1 must be positioned to have its plunger depressed by rocker member 66 to overcome the tendency to skew in the manner contemplated by this embodiment of the invention.

When the crane bridge is coasting or is positively braked when moving along its runway, the skew correcting action of skew detecting device 60 and synchronizing circuit 41 operates in a manner similar to that described above.

Braking may occur when the supply of hydraulic liquid to synchronizing circuit 41 is reduced gradually enough to effect a slowing of the hydraulic motors X and Y without the inertia of the load on the motors causing them to act as pumps in which case, one of the conditions illustrated by FIGURES 3–10 will correct skew. However, the usual braking situation will be that the hydraulic liquid supply flow is reduced at a greater rate to effect a positive braking action on the bridge and its load, either to stop the bridge or to suddenly change its direction of movement.

When this braking action takes place, the inertia of the bridge and its load tends to keep the bridge moving in spite of a reduced volume flow of hydraulic feed. The traction of the wheels 26a on the rails 28 keeps these wheels turning, and causes motors X and Y to act as pumps and draw hydraulic liquid from the supply conduit lines and pump it into the return conduit lines.

Nevertheless, synchronizing circuit 41 and skew detecting device 60 provide the necessary skew correction of the bridge even during a positive braking action on the bridge, and FIGURES 11–14 illustrate two of the four possible conditions of skew that are automatically corrected by synchronizing circuit 41.

In the showing of FIGURE 12, the bridge is moving in the direction R and the motor Y tends to assume a leading position as a result of the tendency to skew. Hydraulic liquid is being pumped through circuit 41 by motors X and Y in the directions indicated by the arrows 92. In accordance with this invention, the leading motor Y is forced to pump against a back pressure created by the depressing of plunger 72 of relief valve 3 (valve 3 having been positioned with respect to rocker member 66 for depressing of its plunger 72 when the skew condition of FIGURE 12 occurs). At the same time, the plunger 72 of relief valve 1 associated with motor X is permitted to rise an amount corresponding to the depression of plunger 72 of valve 3, which reduces the back pressure that motor X pumps against a corresponding amount. Thus, the braking action of motor Y is made somewhat greater than the braking action of motor X as required to overcome any tendency to skew under the operating conditions of FIGURE 12.

FIGURE 14 illustrates crane bridge movement in the direction F in which motor Y is tending to lead under positive braking conditions on bridge 22. Motors X and Y are pumping hydraulic liquid from the supply to the return sides of the hydraulic system, as indicated by the arrows 93, and under these conditions, relief valve 4 of motor Y is operated in the manner already indicated to have motor Y apply a greater braking action on bridge 22.

The other two possible skewing conditions when the bridge is being braked are not illustrated as it is believed that it will be now obvious to those skilled in the art how circuit 41 and skew detecting device 60 will function to correct skew under these conditions of operation.

The embodiment of FIGURES 1–19 is preferred because it effects direct control of torque output of motors X and Y, and since skewing tendencies are usually caused by off center loads on the bridge, it is the torque output of the motor that must be ultimately changed to correct the skew. This is done in the embodiment of FIGURES 1–19 by having the motors on the leading side of the bridge work against a back pressure in the return conduit lines, which subtracts directly from the torque output of the leading motors.

The hydraulic synchronizing circuit 41a forming the squaring control motor system means of the embodiment of FIGURES 23–28 achieves the same skewing correction squaring control by controlling the speed of operation of motors X and Y. Circuit 41a also does not need or require a separate motor or engine for skew control purposes, and thus is a squaring control device of the aforementioned non-energy introducing type.

Synchronizing circuit 41a (see FIGURE 25) is supplied with hydraulic liquid by directional and speed control circuit 39 which in the form illustrated includes the same components as that shown in FIGURE 2 as indicated by the corresponding reference numerals, except that relief valve 43 is interposed directly in supply conduit 83. The hydraulic system downstream of the four way control valve 52 forms the circuit 41a, which includes counterbalance valves 136 and 138, check valves 140, 142, 144 and 148, fixed orifice flow control valves 150 and 152, a variable orifice flow control valve 100, and motors X and Y (motors X and Y in the showing of FIGURE 25 being coupled directly to the respective wheels 26a for simplicity of illustration).

Conduit 154 extends between one port of four way control valve 52 and a port 156 of counterbalance valve 136, conduit 158 extending between conduit 154 and port 160 of counterbalance valve 138 for the purpose of holding counterbalance valve 138 open against the action of an appropriate biasing spring 162, when a four way control valve 52 is positioned to admit hydraulic liquid under pressure to conduit 154. A similar conduit 164 communicates with counterbalance valve 138 at port 166, conduit 168 extending between conduit 164 and port 170 of counterbalance valve 136 for the purposes of holding counterbalance valve 136 open against the action of its spring 171 when the direction of hydraulic liquid flow is reversed.

A conduit 172 including the segments 174, 176, 178 and 180 extend between conduit 154 and the port 182 of motor X, check valve 140 being interposed in conduit 172 between conduit 154 and conduit segment 178. Conduit 185 connects the conduit section 180 and port 186 of counterbalance valve 136.

A conduit 181 including segments 183, 184 and 187, extends between port 188 of motor X and port 190 of motor Y.

The other side of the hydraulic system includes conduiting similar to that already described, a conduit 192 extending between the conduit 164 and port 194 of motor Y, the conduit 192 including segments 195, 196, 197 and 198 and having interposed therein check valve 144 between conduit 164 and conduit segment 196. Conduit 200 extends between conduit segment 198 and port 202 of counterbalance valve 138.

A bypass conduit 204 in effect extends across the ports 182 and 188 of motor X, and as illustrated, the conduit 204 has check valve 142 and flow control valve 150 interposed therein. Motor Y has a similar bypass conduit 206 connected thereabout and conduit 206 has check valve 148 and flow control valve 152 interposed therein. As illustrated, bypass conduit 204 extends between conduit segments 176 and 184, while bypass conduit 206 extends between conduit segments 184 and 197.

A conduit 208 extends between port 156 of counterbalance valve 136 and conduit 154 while conduit 210 extends between port 166 of counterbalance valve 138 and conduit 164.

Conduit 181 thus connects motors X and Y in series, a conduit 212 extending between conduit 181 and variable orifice flow control valve 100, which returns hydraulic liquid to tank 44 through an appropriate conduit 214.

The check valves 140, 142, 144 and 148 may be of any conventional type that will block hydraulic liquid flow in the direction indicated by the arrowheads, that is hydraulic liquid flow is permitted in the direction opposite to that indicated by the arrow heads. The counterbalance valves 136 and 138 may be of any suitable type, their functions being well known in the art. Pressure relief valves 213 of any appropriate type may be connected across the inlet and outlet ports of motors X and Y as a safety factor against excessive pressures in the adjacent circuiting during braking of the bridge, when these motors may tend to act as pumps.

Flow control valves 150, 152 and 100, may be of the type shown diagrammatically in FIGURES 27 and 28, and may include a valve body 220 formed with an inlet 222 which leads to a flow control valve head 224 and thence to a flow outlet 226. The volume flow passing from outlet 226 is rendered constant by a hydrostatic compensating device generally indicated at 228 which includes a double headed piston 230 biased toward the right hand side of FIGURE 27 by a spring 232.

The function of the various structural elements illustrated in FIGURE 27 is well known in the art, so no further specific showing is believed necessary, though it may be mentioned that the primary function of these valves is to provide accurate volume control in hydraulic circuits regardless of any variations in the imposed liquid pressure. In the illustrated embodiment, the flow control member 224 comprises a tapered element 236 (see FIGURE 28) which, in the case of valves 150 and 152 is secured in place to permit a fixed amount of liquid flow to pass the respective valves, while in the case of valve 100, the member 236 is mounted to permit variation of the liquid flow past the valve.

In the case of valves 150 and 152, the member 236 may be locked in place by suitable lock nuts engaging stem 238, and the member 236 is preferably positioned so that the valves 150 and 152 will pass a liquid flow that is equivalent to the leakage through the respective motors 40 and 42.

In accordance with this invention, the valve 100 is opened and closed by the skew detecting device 60a of FIGURES 23 and 24 to achieve skew control over bridge 22. Device 60a includes a datum arm or truing member 61a biased against one of the rails 28 by spring 62a and connected to the crane by parallel links 240, valve 100 being carried by one of the crane girders 30 where indicated at 242 in FIGURE 24 and having its stem 238 actuated by one of the links 240. In the showing of FIGURE 23, the skew detecting device 60a is applied to bridge end corresponding to the end closest to the observer in the showing of FIGURE 1.

When the synchronizing circuit 41a and bridge skew detecting device 60a are employed, the squaring control provided over the crane bridge is effective for acceleration, deceleration, and uniform speeds of the bridge in either direction of its movement (regardless of the directional and speed control circuit employed). In this embodiment of the invention, the bridge skew detecting device 60a together with valve 100 of circuit 41a effect the changes in the speed of operation of motors X and Y necessary to overcome any tendency of the bridge to skew, even during braking of the bridge, thus keeping the operation of motors X and Y in substantial synchronism during operation of the crane.

For instance, assuming that the four way control valve 52 of directional and speed control circuit 39 is positioned to make conduits 154 and 164 the supply and return lines, respectively, so that the bridge of the crane will move to the left of FIGURE 25 (direction F) and the bridge is accelerating or moving at uniform speed, hydraulic liquid passing through four way control valve 52 will enter conduit 154 and pass thence to conduit 172 and through its check valve 140 as well as its segments 174, 176, 178 and 180 to port 182 of motor X. The spring 171 of counterbalance valve 136 maintains this valve closed while the pressure of the hydraulic liquid in conduit 158 holds counterbalance valve 138 open against the action of its spring 162, as shown in FIGURE 25.

The hydraulic liquid is forced through motor X to operate same and passes thence to conduit 181 and its segments 183, 184 and 187 to port 190 of motor Y. The hydraulic liquid is forced through motor Y to operate same and then leaves its port 194 through conduit segments 198 and 200 to port 202 of counterbalance valve 138 and through counterbalance valve 138 and conduit 210 to conduit 164 and thence back through four way control valve 52 to reservoir 44.

At the same time, the fixed orifice flow control valve 150 permits a volume flow through bypass conduit 204 equivalent to the volume of hydraulic liquid leaking by motor X. This bypass quantity of hydraulic liquid may be considered a compensating quantum as it is employed to speed up the operation of motor Y where this is necessary; its actual amount should be as little as possible since it represents power lost from the system, but it may be larger in amount than the volume of hydraulic liquid leaking by the motor.

The neutral setting of valve 100 is such that it returns to tank 44 a fluid flow equivalent to that being passed by fixed orifice flow control valve 150. The valve 100 is at this setting as long as the crane bridge remains square with its runway, the links being proportioned and adjusted so that arm 61a of sensing device 60a is parallel with the bridge girders when valve 100 is in its neutral setting.

If, when the crane bridge is moving to the left of FIGURE 25 (direction F) and the bridge is accelerating or moving at uniform velocity, the end of the bridge on which motor X is mounted tends to run ahead of motor Y, the sensing device 60a and valve 100 effect a sufficient speeding up of motor Y to offset the tendency of the bridge to skew. In the embodiment of FIGURES 23–25, the sensing device 60a effects a pull on stem 238 of valve 100 as bridge 22 tends to move out of square with its trackway to reduce the amount of hydraulic liquid passing through valve 100, and thereby effects a larger volume of flow of liquid through conduit 181 to motor Y. This speeds up motor Y a corresponding amount so that the tendency of the bridge to skew is overcome and the action of motors X and Y on the bridge remains synchronized.

If the end of the bridge on which motor X is mounted tends to lag as the bridge is moving to the left of FIGURE 25 (direction F), the sensing device 60a effects a push on stem 238 of valve 100 to further open this valve so that it will pass a larger volume of flow of hydraulic liquid to tank 44. This means that a less volume flow of hydraulic liquid reaches motor Y with the result that motor Y tends to slow down whereby the tendency of the bridge to skew is overcome, and the action of the motors X and Y on the bridge remains synchronized.

Manifestly, the proportioning of the elements of sensing device 60a and the movement of stem 238 of valve 100, as well as the liquid flow provided by this valve must be such that the adjustment made by the sensing device 60a on valve 100 in response to a tendency to skew effects the desired reduction in or increases flow of the hydraulic liquid to motor Y.

The same hydraulic action described immediately above obtains when the volume flow of hydraulic liquid supplied to circuit 41a is reduced gradually enough to effect a slowing of the motors without the inertia of the load on the motors causing them to act as pumps. However, the hydraulic liquid supply flow may be, and frequently is, reduced at a greater rate to effect a braking action on the bridge and its load.

When this braking action takes place, the combined inertia of the bridge and its load tends to keep the bridge moving in spite of a reduced volume flow feed; the traction of the wheels 26a on the rails 28 keeps the wheels turning, and causes motors X and Y to act as pumps, which temporarily reverses the flow of hydraulic liquid in circuit 41a. Thus, motor Y pumps hydraulic liquid into conduit 181 and motor X pumps hydraulic liquid into conduit 180, pressure relief valves 213 being set to return hydraulic liquid to, for instance, the port 188 side of motor X when the pressure in conduit 180 side exceeds a safe maximum.

Where the valve 100 is positioned to reduce the volume of hydraulic liquid returned to tank (under the skewing conditions first assumed above), the motor X when acting as a pump will operate under a somewhat greater pressure than motor Y, which effects a drag on the motor X that corresponds to the speeding up effect achieved on motor Y when motors X and Y act as motors. When the valve 100 is positioned to increase the rate of return of hydraulic liquid to tank due to the lag of the end of the bridge on which motor X is mounted, motor Y under braking conditions will operate under a greater back pressure than motor X, which means that motor X will operate as a pump at a greater rate than motor Y, this differential corresponding to the reduction of speed of motor Y when motors X and Y act as motors.

Thus, the synchronizing action of circuit 41a keeps the effective output of motors X and Y in synchronism on braking of the bridge, although the compensating action is applied to the opposite ends of the bridge. The changes in direction of hydraulic liquid flow in circuit 41a are entirely automatic and since the circuit is so arranged that the necessary compensating action is achieved regardless of the speed of operation of the bridge, skewing is effectively prevented.

When the bridge is moved to the right (direction R) instead of to the left, the action of the skew sensitive device 60a and valve 100 effects a similar control over the crane bridge, though the flow of hydraulic liquid is reversed to achieve reverse operation of motors X and Y as motors. This is done by moving four way control valve 52 to its opposite setting to make conduit 164 the pressure or supply side of the system, and under other than braking operating conditions, the hydraulic liquid under pressure would enter conduit 164 and pass thence through conduit 192, its check valve 144, and its segments 195, 196, 197 and 198 to port 194 of motor 42. Counterbalance valve 138 would be held closed by its spring 162, the pressure of the hydraulic liquid in conduit 168 holding counterbalance valve 136 open.

The hydraulic liquid is then forced through motor Y to operate same and leaves motor Y through port 190, and conduit segments 187, 184 and 183 to port 188 of motor X, through which it is forced to operate same and leaves through port 182 and thence through conduit segments 180, 185, counterbalance valve 136, conduit 208 and conduit 154 back to four way control valve 52.

During operation of the crane bridge to the right of FIGURE 25, fixed orifice flow control valve 152 in bypass conduit 206 permits a bypass liquid hydraulic flow equivalent to the hydraulic liquid that leaks by motor 42.

If the end of the crane bridge at which motor X is secured runs ahead under other than braking operating conditions, the skew detecting device 60a effects a push on valve stem 238 to increase the volume flow passed by valve 100 to reduce the liquid flow reaching motor X which thereupon slows down sufficiently to overcome the tendency to skew; under braking conditions, motor X operates as a pump under greater back pressure than motor Y, which holds down the operation of motor X (with respect to motor Y) to achieve the same result. If the end of the bridge at which motor X is secured tends to lag the other end of the bridge, the skew detecting device 60a effects a pull on stem 238 to close valve 100 a corresponding amount, which effects a speeding up of motor X sufficiently to overcome the tendency to skew; under braking conditions, motor X operates as a pump under proportionately less back pressure than motor Y, which maintains the increased speed (with respect to motor Y) to achieve the same result. The pressure relief valve 213 across motor Y acts in the same manner as that across motor X.

FIGURE 26 illustrates a simplified directional and speed control circuit 39a which may be substituted for circuit 39, and includes a suitable form of variable volume reversible pump 48a, actuated by an appropriate motor 46a, that supplies hydraulic liquid directly to circuit 41 or 41a (valve 52 being omitted). Pump 48a and its pump 46a are operated at the speed and direction desired to achieve directional and speed control of motors X and Y, additional hydraulic liquid being supplied to this circuit through check valves 49 when the pressure on the suction side of the pump 48a reaches a predetermined minimum.

Motor 46 and pump 48 (or motor 46a and pump 48a) may be mounted on the bridge in any suitable manner, and the hydraulic conduiting required arranged about the bridge as may be necessary or desirable.

*Bridge skew detecting devices*

The bridge skew detecting device 60 of FIGURES 1–19 is diagrammatically illustrated in FIGURES 1 and 2, while a specific form 79 of same is shown in FIGURES 15–19. The bridge skew detecting device 60a of the embodiment of FIGURES 23–28 is shown in FIGURES 23 and 24.

The rocker member 66 of device 60 is shown mounted on a platform 250 suitably secured to one of the bridge girders 30, which platform also carries the respective relief valves 1–4 of the synchronizing circuit 41. Valves 1–4 may be associated with a suitable manifold structure (not shown) connected by appropriate conduiting to the various hydraulic components already described.

The specific rocker member 66 illustrated includes a shaft 252 journalled in spaced lugs 254 affixed to said platform 250 and includes a fixed arm 256 appropriately secured to projection 65 of the truing or datum arm or member 61. Shaft 252 has affixed thereto spaced arms 258 and 260 which are operatively connected in any suitable manner, as by suitable pivot joints 262, to the respective plungers 72 of relief valves 1–4.

Truing or datum member or arm 61 should be connected to the bridge 30, as by employing link 264 pivotally connected to a girder 30 and truing member 61 at 265. The member or arm 61 is supported from the adjacent truck 34 by suitable hanger members 266 that may be of the general type described in connection with specific embodiment 79.

The specific bridge skew detecting device 79 (FIGURE 15) comprises a channel member 270 which corresponds to truing or datum arm 61 and which has fixed thereto spaced arms 272 that in turn carry pins 274 for journalling rollers 276 which ride against the head 64 of the adjacent rail 28. The pins 274 are spaced equal distances from the center line of channel member 270 so that when rollers 276 are in engagement with the rail 28, the member 270 extends parallel to rail 28.

The rollers 276 are biased against the rail 28 by compression springs 278 acting between the channel member 270 and angle brackets 280 that are affixed to the two girders 30 (only one being shown in FIGURE 15) by appropriate angle members 281 (see FIGURE 16) affixed to the respective girders in any suitable manner. Springs 278 each may be conveniently mounted in place by being received over a pin or rod 282 received at one of its ends in a hole in the adjacent flange 284 of member 270 and secured to angle member 280 by appropriate locking nuts 286. In the specific form illustrated, pins 282 fixedly carry washers 287 against which springs bear.

Channel member 270 has fixed to the top surface thereof an upright post 288 fixedly carrying a plate 290 to the opposite ends of which are secured a pair of links 291 and 292, as by employing appropriate bolts or screws 294. The other ends of the arms 291 and 292 are received over a bolt 296 and disposed on either side of a lug 298 carried by a rocker plate 300 that corresponds in function to rocker member 66.

Pin or bolt 296 is received through lug 298 and may carry a suitable lock nut 302 for locking the parts in position.

In this specific embodiment of the invention, the links 291 and 292 are in the forms of rods 304 and 306 each formed with threaded ends 308 for connection with the female type rod end bearing units 310. As is well known in the art, the rod end bearing units 310 each comprise a housing portion 312 formed with an annular end 314 that swivelly receives a ball member 316 which has a spherically contoured external surface that is complementary to a spherically contoured internal surface of the housing annular portion 314. Housing portion 312 also includes the internally screw-threaded stem portion 318 that receives the respective ends 308 of rods 304 and 306.

Rocker plate 300 is formed with spaced lugs 320 which receive a rocker shaft 322 journalled in appropriate bearing units 324, which in the form illustrated are of the pillow block type. Bearing units 324 are affixed to the top of an appropriate manifold structure 326 with which relief valves 1–4 of synchronizing circuit 41 are associated in any suitable manner for functioning in accordance with the principles previously described. Manifold structure 326 may be affixed to the adjacent girder 30 as by appropriate brackets 328.

The channel member 270 of device 79 is supported from the adjacent truck 24 by hanger members 330 and 332 connected to suitable brackets 334 and 336, respectively (see FIGURE 15). Preferably, hanger member 330 is in the form of a male type rod end bearing 338, see FIGURE 17 (which has the same essential components already described in connection with bearings 310) and is secured to the adjacent bracket 334 by an appropriate nut 340, and is received over a pin 342 applied between spaced lugs 344 affixed to plate 290 of post 288.

The hanger member 332 (see FIGURES 15 and 19), preferably comprises a rod 346 affixed to rod end bearings 348 that are of the same type as bearings 310, with the upper bearing 348 being received over an appropriate pin 350 affixed to bracket structure 336 (and held in place by an appropriate nut 352) and the lower bearing 348 receiving pin 354 secured between spaced lugs 356 affixed to the top of channel member 270.

In this specific embodiment of the invention in the form illustrated, the valves 1–4 take the form of conventional pilot operated relief valves 360 (see FIGURE 18) of the type shown in FIGURE 3 provided with plungers 362 (corresponding to plungers 72), which are engaged by screws 364 (see FIGURE 18) carried by rocker plate 300 (these being locked in adjusted position by appropriate lock nuts 366). The individual valves 360 are incorporated in a synchronizing circuit 41 and oriented with respect to the rocker plate 300 and the sensing device 79 in the manner suggested by FIGURE 2.

In operation, when the crane bridge tends to skew under the conditions indicated by FIGURE 4, the truck 24 adjacent the bridge skew detecting device 60 tends to move somewhat ahead of the rocker plate 300, which has the effect of pivoting rocker plate 300 counterclockwise of FIGURE 15 about the axis of its rocker shaft 322. In doing this, links 291 and 292 act in tension and compression, respectively, to apply the necessary bias on the rocker plate 300, and since the lug 298 of the rocker plate is spaced above the axis of rocker shaft 322, the rocker plate will pivot in the direction indicated for this condition of skew. The rod end bearings 310 permit the limited twisting action on rods 304 and 306 rendered necessary by the spaced connection of these rods to the rocker plate 300.

The rod end bearings of hangers 330 and 332 accommodate relative movement between truck 34 and channel member 270 of the sensing device 79 which will occur as the bridge moves along its runway because of the minor rail misalignments that are so frequently found in overhead crane installations.

It may be mentioned that FIGURES 15–19 illustrate familiar portions of a specific form of conventional crane bridge 22 and its trucks 24.

Referring now to the bridge skew detecting device 60a of FIGURE 23, truing or datum member or arm 61a carries rollers 370 rotatably secured thereto by pins 372 affixed between pairs of plates 374 secured at each end of the member 61. The pins 372 are spaced equal distances from the center line of member 61a so that when these rollers are in engagement with rail 28, the member 61a will be parallel to this rail.

The truing or datum member 61a has affixed thereto arm or link 376 which is positioned at right angles with respect to member 61a and pivotally carries at its end the link 240 which serves as a connecting rod to stem 238 of valve 100. This link 240 is pivoted to arm 376 as at 378 and is pivotally secured to stem 238 as at 380.

The other link 240 is pivotally secured to arm 376 as at 382 and to an arm 384, as at 386, that is fixed to the adjacent truck 24. Spring 62a is secured between truck 24 and arm 376.

The link 240 that is connected to valve 100 preferably is made adjustable in length as by employing a suitable screw-threaded fitting where indicated at 386 in FIGURE 24, for purposes of properly adjusting the operation of sensing device 60a. The valve 100 is placed in operative relation with the sensing device 60a by being secured in any suitable manner to supporting bar or member 388 that is affixed to suitable supports 390, welded or otherwise secured to one of the girders 30.

Device 60a may be positioned in association with either girder 30 at either end of each girder, or may be associated with a special framework carried between or on either side of the girders, as will now be obvious to those skilled in the art, so long as the hydraulic circuit valve 100 is mounted for operation in the manner that is consistent with the objects of the invention.

During movement of the crane bridge on its runway, the truing or datum member 61 is maintained in true alignment with the rail 28 that it bears against, and since link or arm 376 is fixed with respect to member 61, it is always transversely disposed with respect to the crane runway. The links 240 form a parallel linkage between the squaring control arm 376 and the crane bridge, and if the bridge tends to skew in either direction with respect to its runway, stem 238 of valve 100 is moved to vary the hydraulic liquid feed to the hydraulic motors in the manner indicated so as to counteract and effectively prevent the tendency to skew.

*Modified forms of the invention*

Referring now to the skew or squaring control embodiment of FIGURES 20 and 21, bridge wheels 26a are shown coupled to an appropriate motor 400, which may be of any suitable type, either electrical or hydraulic, and operated in any suitable manner as part of a switchable motor system means. The respective motors 400 (also marked $X_1$ and $Y_1$ to indicate their relation to motors X and Y) drive the respective wheels 26a through appropriate gear reducers 402 in any conventional manner. Also directly coupled to motors 400 are stub shafts 404 journalled in any suitable manner in the trucks 24 (not shown) which have associated therewith brake units of the type indicated at 406 in FIGURE 21. These units include a clutch device of a commercially available type known as the Sprag clutch, which includes an annular member 408 formed with a plurality of recesses 410 each of which receives a ball member 412. The recesses 410 are shaped to have a wide rounded portion 414 and a narrow portion 416, and as is well known in the clutch art, when the shaft 404 turns in the direction of the arrow of FIGURE 21, the ball members 412 become lodged in the restricted area provided by the narrow portions 416 of notches 410 to cause rotation of the annular member 408, but when rotation is in the opposite direction, drive is not transmitted to annular member 408 as the ball members 412 will merely rotate in the larger portions 414 of recesses 410.

The brake devices also each include an appropriate form of brake shoe 418 actuated by a suitable linkage 420 and brake cylinder 422 to achieve a clamping action on member 408. The linkages 420 each comprise pivotally connected arms 424 and 426, the latter being respectively pivotally connected to piston rods 428 respectively affixed to pistons 430 of brake cylinder 422. Arms 426 are pivotally connected to the truck, as at 429, in any suitable manner.

Brake cylinder 422 is hydraulically operated by actuator cylinder 432, which includes a reciprocable piston 434 carrying piston rod 436 that projects outwardly of the cylinder 432; piston 434 is biased away from the head end of the cylinder 432 by an appropriate spring 438. Appropriate hydraulic conduits 440 extend between the crank end of cylinder 432 and the crank ends of cylinder 422 while an appropriate hydraulic conduit 442 extends between the head end of cylinder 432 and the central portion of cylinder 422.

In accordance with this embodiment of the invention, two of the brake devices 406 are operatively associated with each shaft 404 and serve the functions of relief valves 1–4 in the embodiment of FIGURE 1 and 2. The piston rods 436 serve the same functions as plungers 72 of valves 1–4 and cylinders 432 are associated with, for instance, a bridge skew detecting device 60 (the specifics of which are shown in FIGURE 15–19) in a manner similar to that shown in FIGURE 1. Of course, the respective brake devices 406 are operationally related similarly to the functioning of valves 1–4 (as indicated by the reference numerals of FIGURE 20) so that they individually will effect a braking action on the respective shafts 404 at one position of skew of the overhead crane bridge in accordance with the principles already described.

For instance, in the showing of FIGURE 20 the brake devices 406 are marked 1a, 2a, 3a and 4a, respectively, to indicate that their braking action corresponds in function to the operative function of relief valves 1–4 of synchronizing circuit 41. This means that the brake device 406 employed where indicated at 2a is applied to the indicated shaft 404 in such a manner that when shoes 418 are clamped against member 408, shaft 404 will be rotating in a direction that will also rotate annular member 408 when the skew conditions of FIGURE 4 obtain. However, the brake device 406 employed where indicated at 3a must be applied to its shaft 404 in the opposite manner so that the clamping action of shoes 418 on its annular member 408 will have no affect on this shaft 404 under this condition of skew. The same applies to the brake devices 406 employed where indicated at 1a and 4a for the other conditions of skew already described.

It will thus be seen that when the skewing condition of FIGURE 4 obtains or tends to obtain, the sensing device employed (for instance device 60) will operate actuator cylinder 432 of the brake device 406 serving where indicated at 2a to brake shaft 404 as required to overcome the tendency to skew. Operation of the brake device at other positions of the skew will be obvious from what has already been disclosed, and it will be clear that the motor system means of FIGURES 20 and 21 including brake devices 406 and their controls is a squaring control motor drive system in accordance with this invention, and that brake devices 406 and their associated and controlling parts form a squaring control device of the aforementioned non-energy introducing type.

Referring now to the embodiment of FIGURE 22, bridge wheels 28a are shown coupled to suitable alternating current electric motors 450 in any suitable manner (forming a part of a suitable motor system means), as by appropriate shafts 451 and gear box 452 as well as suitable couplings unillustrated, which motors 450 also drive the respective shafts 454 corresponding in function to shafts 404 of FIGURE 20. Brake devices 456, functionally similar to brake device 406, are employed where indicated at 1b, 2b, 3b and 4b on the respective shafts 454 and serve the same functions as brake devices 406. In this embodiment of the invention, the brake shoes employed are of the electromagnetic type applied against an annular member 408 in any suitable manner and connected to a source of D.C. power in the manner diagrammatically illustrated in FIG. 22.

Bridge skew detecting device 460, which is similar to the device of FIGURE 23, may be employed in connection with this embodiment of the invention, which includes a truing or datum member 61a carrying fixed arm 376a connected to the bridge frame by link 462 through pivotal connections where indicated at 464 and 466. Arm 376a is pivotally connected to lever 468, pivotally connected to the bridge frame as at 470, the latter pivotally carrying reciprocating members 472 and 474 on either side of the pivotal axis 470. The reciprocating members 472 and 474 are operatively associated with resistors 476 and 478, respectively, each of which is connected across the D.C. power lines 480. In accordance with this embodiment of the invention, the reciprocating members 472 and 474 each carry a contact member 482 and 484, respectively, that form means for varying the effective resistance of resistors 476 and 478 in those circuits in which they are connected. It will be noted that the shoes of the brake devices 456 located where indicated at 1b and 4b are connected in parallel by leads 486 and 488, with the leads 486 also being connected to the variable contact 484 and resistor 478, respectively. The brake devices 456 located where indicated at 2b and 3b are connected in parallel by leads 490 and 492, respectively, leads 490 being connected respectively to contact 482 and resistor 476.

The brake devices 456 when operationally positioned with respect to each other as indicated by reference numerals 1b, 2b, 3b and 4b (which indicate the corresponding relation of valves 1–4 of circuit 41) will operate in the same manner as the embodiment of FIGURES 20 and 21 to provide the squaring control motor drive system contemplated by this invention. For instance, when the skewing conditions of FIGURE 4 occur, pointer 482 is moved with respect to resistor 476 as required to give the electromagnetic shoes of brake device 2b the additional magnetic action required to brake the lead motor 450 that amount which will eliminate the tendency to skew. Since the clutch device of the brake device 456 located at 3b will be in its non-operating position, the trailing motor 450 will be unaffected by its braking device 456. The other braking devices controlled by contact 484 will tend to reduce the magnetic action in shoes which will reduce the resistance to the trailing motor 450.

The bridge skew detecting device 460 may also be employed for directly controlling electric motors serving the function of motors 450 in other squaring control motor drive systems in accordance with this invention. For instance, motors 450 may take the form of squirrel cage A.C. motors each provided with a saturable reactor interposed in the alternate current line feeding the respective motors for reducing the voltage under load to vary speed when bridge skew tendencies require motor operation correction. As is well known in the electrical arts, a saturable reactor is essentially an iron core about which the A.C. line is wound, which core also has a D.C. winding through which D.C. is passed to saturate the core with rather low amperage; when the core is so saturated, it provides virtually no voltage drop to the A.C. current. However, when the D.C. current is reduced from that required to saturate the core (which allows the core to fall below saturation), a considerable voltage drop is experienced by the alternating current, and thus the supply voltage to the motor controlled by the saturable reactor will be reduced.

Applying the foregoing to FIGURE 22, the D.C. supply lines to the respective saturable reactors associated with the squirrel cage A.C. motors serving the purpose of motors 450 would be connected into the simple circuits shown controlling the illustrated brake shoes, in place of such shoes, and in the functional relation required to make the motor at the leading end of the bridge the low speed motor, when skewing conditions obtain, as required to overcome skew tendencies.

Alternately, skew detecting device 460 may be employed to control the field energization of D.C. bridge drive motors connected in shunt, whereby each motor armature is given a constant direct current voltage while the field of the motor is weakened or strengthened by the control. In this arrangement, weakening of the motor fields will increase r.p.m. of the motor. Control device 460 can also be used to control the D.C. voltage reaching the armature of series wound D.C. motors or the armatures of shunt wound D.C. motors having a constant field strength.

Of course, all of the above alternate arrangements would eliminate brake devices 456, and the resistors 476 and 478 as well as contacts 482 and 484 would be positionally related and wired to function in the same alternate manner described in connection with the illustrated forms of the invention.

*Distinguishing characteristics of the invention*

It will thus be seen that my invention provides a number of important advantages, some of which have already been brought out.

Perhaps the most important advantage is the elimination of the large squaring shaft required on conventional overhead cranes to prevent skewing of the bridge with respect to its runway. The drives illustrated herein also eliminate the need for the conventional gear train and its associated structures. The usual variable speed electric motor is also eliminated in favor of a constant speed continuous duty motor in the cases of the embodiments of FIGURES 1–19 and 23–25.

The hydraulic motors of my said copending application Serial No. 710,452 when employed to drive the crane bridge, provide high torque at low speed without pulsation and thereby provide stepless speed control from exceedingly low to relatively high speeds regardless of the load carried by the crane. They also permit stepless speed control from relatively high speeds to a complete halt under the same conditions. Thus these hydraulic motors permit the bridge to be braked gradually without employing friction surfaces.

One of the most important aspects of the invention is that continuous and uninterrupted control over the movements of the crane bridge is achieved in spite of the important limitations in crane bridge design necessitated by the use to which it is to be put. For instance, the crane bridge must be fixed to its trucks to secure adequate support for the loads to be carried by the crane. Furthermore, the two flanges of the truck wheels must be spaced apart far enough so that there will be a clearance on the order of ½ inch on either side of the respective track rails. This extra gauge dimensioning is necessitated by the fact that the tracks for overhead cranes customarily deviate somewhat from parallelism with the crane bridge trackway and since the crane must be free to move down the full length of its trackway to serve its intended purpose, there must be adequate spacing between the rail and the truck flanges to permit such movement regardless of the irregularities in the rails.

These characteristics of overhead crane construction preclude the use of skew control arrangements based on the guiding action that the rails may have on the crane bridge wheels or the pivotal action between the trucks and bridges. Nevertheless, my invention achieves complete control of crane bridge movement and yet provides a separate bridge skew detecting apparatus which is independent of the basic crane structure and may be associated with either end of same as desired (so long as the necessary orientation of components is observed to obtain the results herein described), which provides my squaring control with a high degree of versatility of application.

Furthermore, the squaring control achieved by all the illustrated embodiments of this invention does not require the introduction into the motor drive systems involved of additional motive energy to effect the bridge movement adjustment required, as the bridge movement adjustment provided by this invention is achieved by controlling the motive energy supplied by the motors that power the bridge drive wheels. The control provided by my invention is thus of the non-energy introducing type.

It will also be observed that the bridge skew detecting devices of this invention need only operate in connection with one track rail of the trackway, or some other suitable guide rail or member, and do not obstruct in any way the normal operation of overhead cranes or the vision of those operating same. Also, the control arrangement of the embodiment of FIGURES 15–19 of this invention is not affected by movement of the crane bridge laterally of the track rail, as might be caused by the rails being at somewhat different elevations, or otherwise.

While the crane structures illustrated herein usually operate on a straight runway, the bridge skew detecting devices and synchronizing circuits of this invention may readily be adapted for negotiating a curved trackway by properly proportioning and actuating the bridge skew detecting devices so that the necessarily speeding up or slowing down of the respective crane motors is achieved. Moreover, my invention is applicable to any wheeled vehicle (including those not employing flanged wheels running on rails) for maintaining the operation of the vehicle in alignment with a predetermined path of movement, but it is particularly applicable to the overhead crane art because of the specific design problems mentioned above.

The term "uniform angular torque output type hydraulic motor" as it may be employed in the appended claims means the motors described in my said copending application Serial No. 710,452 as well as their equivalents.

The term "synchronizing" as employed with reference to the hydraulic circuiting for controlling the operation of the illustrated crane truck motors is intended in the appended claims to mean equivalent hydraulic circuits for operating vehicles on curved runways, or runways that include curves. The terms "upstream" and "downstream" as used in the appended claims refer to the direction corresponding to the direction of hydraulic liquid flow through the hydraulic components referred to.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. In an overhead crane including a bridge having a truck at each end thereof with the trucks including wheels riding on supporting rails of a trackway, and with the bridge being moved along the trackway by driving one of the wheels of each truck, the improvement wherein said crane includes:

(a) motor system means including reversible motor means for reversibly driving said one wheels for selectively moving said crane bridge in forward or reverse directions longitudinally of the trackway, (b) bridge skew sensitive detecting means carried by the bridge for continuously and uninterruptedly detecting angular displacement of the bridge with respect to the trackway, (c) said bridge skew sensitive detecting means including a datum member and means for continuously maintaining said datum member in alignment with said trackway, (d) and bridge forward or reverse movement control means of the non-energy introducing type operatively connected to said motor system means and continuously and uninterruptedly responsive to said detecting means for adjusting the rate of movement of the bridge ends, on forward or reverse movement, respectively, of the bridge relative to its trackway, as required to maintain the bridge square with the trackway, whereby the bridge is maintained square with the trackway without adding motive energy to said motor system means to maintain said square relationship, (e) said movement control means including means responsive to said detecting means for adjusting the rate of movement of one of the bridge ends on forward movement of the bridge in accordance with the degree of angular displacement of the bridge from said square relationship, (f) means responsive to said detecting means for adjusting the rate of movement of the other of the bridge ends on reverse movement of the bridge in accordance with the degree of angular displacement of the bridge from said square relationship, (g) and means for automatically rendering the respective adjusting means operative on reversal of direction of movement of said bridge.

2. In an overhead crane including a bridge having a truck at each end thereof with the trucks including wheels riding on supporting rails of a trackway, and with the bridge being moved along the trackway by driving one of the wheels of each truck, the improvement wherein said crane includes:

(a) motor system means including motor means for reversibly driving said one wheels for selectively moving said crane bridge in forward or reverse directions longitudinally of the trackway, (b) bridge skew sensitive detecting means carried by the bridge and responsive solely to angular displacement of the bridge for continuously and uninterruptedly detecting angular displacement of the bridge with respect to the trackway, (c) said detecting means including a datum member and means for continuously maintaining said datum member in alignment with said trackway, (d) and bridge forward or reverse movement control means of the non-energy introducing type operatively connected to said motor system means and continuously and uninterruptedly responsive to said detecting means for adjusting the rate of movement of the bridge ends on forward or reverse movement, respectively, of the bridge relative to its trackway, as required to maintain the bridge square with the trackway, whereby the bridge is maintained square with the trackway without adding motive energy to said motor system means to maintain said square relationship, (e) said movement control means including:

(f) means for retarding the rate of movement of the bridge end tending to lead on forward movement of the bridge, when said bridge angular displacement occurs, in accordance with the degree of angular displacement of the bridge from said square relationship, (g) means for retarding the rate of movement of the bridge end tending to lead on reverse movement of the bridge, when said bridge angular displacement occurs, in accordance with the degree of angular displacement of the bridge from said square relationship, (h) and means for automatically rendering the respective retarding means operative on reversal of direction of movement of said bridge.

3. The improvement set forth in claim 2 wherein said movement control means further includes:

(i) means responsive to said detecting means for increasing the rate of movement of the bridge end that tends to lag on forward movement of the bridge, when said angular displacement occurs, in accordance with the degree of said angular displacement from said square relationship, (j) means responsive to said detecting means for increasing the rate of movement of the bridge end that tends to lag on reverse movement of the bridge, when said angular displacement occurs, in accordance with the degree of said angular displacement from said square relationship, (k) and means for rendering the respective increasing means operative on reversal of direction of movement of said bridge and the action thereof equal and opposite to the action of said retarding means.

4. In an overhead crane including a bridge having a truck at each end thereof with the trucks including wheels riding on supporting rails of a trackway, and with the bridge being moved along the trackway by driving one of the wheels of each truck, the improvement wherein said crane includes:

(a) motor system means including motor means for reversibly driving said one wheels for selectively moving said crane bridge in forward or reverse directions longitudinally of the trackway, (b) bridge skew sensitive detecting means carried by the bridge and responsive solely to angular displacement of the bridge with respect to the trackway from its squared position with respect to the trackway for continuously and uninterruptedly detecting angular displacement of the bridge from said squared position with respect to the trackway, (c) said detecting means including a datum member and means for maintaining said datum member in alignment with the trackway, (d) and bridge forward or reverse movement control means operatively connected to said motor system means and continuously and uninterruptedly responsive to said detecting means for retarding the rate of movement of the leading bridge end on forward or reverse movement, respectively, of the bridge relative to its trackway, when said bridge angular displacement occurs, and in accordance with the degree of said angular displacement from said squared position as required to maintain the bridge square with the trackway.

5. In an overhead crane including a bridge having a truck at each end thereof with the trucks including wheels riding on the supporting rails of a trackway, and with the bridge being moved along the trackway in forward or reverse directions by driving one of the wheels of each truck, the method of maintaining the bridge square with its trackway and against angular displacement of same from its position of squareness with respect to its trackway when being driven along its trackway, which method comprises:

(a) continuously and uninterruptedly detecting the angular position of the bridge with respect to its trackway, and (b) retarding the rate of movement of the bridge leading end, on forward or reverse movement, respectively, of the bridge relative to its trackway, when said angular displacement occurs, and as required to overcome said angular displacement.

6. In an overhead crane including a bridge structure having a truck at each end thereof with the trucks including wheels adapted to ride on supporting rails of a trackway, and with the bridge structure being moved along the trackway by driving one of the wheels of each truck, the improvement wherein:

(a) the crane is moved along its tracks by employing hydraulic means for driving said wheels of each truck with said one wheels being mounted on said crane for disjunctive rotating movement with respect to each other, (b) said hydraulic means comprising:

(c) a hydraulic motor for each of said one wheels and coupled to said one wheels of each truck, respectively, (d) said motors being mechanically uncoupled with respect to each other, (e) and a hydraulic system including:

(f) hydraulic liquid flow orienting valve means for controlling the flow of hydraulic liquid to and from the respective motors, (g) supply and return conduit means extending between each of said motors and said flow orienting valve means, (h) said motors being connected in parallel in said hydraulic system by said supply and return conduit means, (i) said supply and return conduit means each having interposed therein check valve means for permitting hydraulic liquid flow through the respective supply and return conduit means only in the direction toward the respective motors, (j) a variable orifice valve device for each of said conduit means respectively connected in bypassing relation across said check valve means of the respective supply and return conduit means, (k) and means for supplying a hydraulic pressure liquid to said flow orienting means, (l) bridge skew sensitive detecting means carried by said crane for detecting angular displacement of the bridge structure with respect to the trackway, (m) said bridge skew sensitive means including a datum member, (n) means for connecting said datum member to said crane for movement therewith longitudinally of said trackway, (o) means for maintaining said datum member in a predetermined position of orientation with respect to said trackway as the crane moves along said trackway, (p) and linkage means secured between said datum member and the respective valve devices for varying the orifices thereof to vary the torque output of the respective motors as required to maintain the bridge structure square with the trackway during movement of the crane along the trackway.

7. In an overhead crane including a bridge structure fixed between trucks each journalling at least two double flanged wheels, with the wheels of each truck riding on a track rail of a pair of parallel track rails defining the trackway of the crane, and with the flanges of said wheels having a fixed spacing that exceeds the width of the respective track rail heads, the improvement wherein:

(a) the crane is moved along its track by employing hydraulic means for driving at least one of the wheels of each truck, (b) with said one wheels being secured to said crane for disjunctive rotating movement with respect to each other, (c) said hydraulic means comprising:

(d) a hydraulic motor for each of said one wheels and coupled to said one wheels of each truck respectively, (e) and a hydraulic system including:

(f) hydraulic flow orienting valve means for controlling the flow of hydraulic liquid to and from the respective motors, (g) supply and return conduit means extending between each of said motors and said flow orienting means, (h) said motors being connected in parallel in said hydraulic system by said supply and return conduit means, (i) said supply and return conduit means each having interposed therein check valve means for permitting hydraulic liquid flow through the respective supply and return conduit means only in the direction toward the respective motors, (j) and means for supplying a hydraulic pressure liquid to said flow orienting means, (k) and bridge skew sensitive detecting means operatively associated with said hydraulic system for detecting angular displacement of the bridge structure with respect to the trackway from its square position with respect to the trackway, (l) said bridge skew sensitive means comprising a datum member carried by said crane, (m) means for maintaining said datum member in alignment with one of the track rails as the crane moves along the rails, (n) a variable orifice valve device for each of said conduit means connected in bypassing relation across said check valve means of the respective supply and return conduit means, (o) said variable orifice valve devices being carried by said bridge structure and each including a plunger operably associated therewith for controlling the orifice opening thereof, (p) a rocker member carried by said bridge structure, (q) with the plunger of one hydraulic motor return conduit means variable orifice valve device and the plunger of the other hydraulic motor supply conduit means variable orifice valve device being disposed on one side of the axis of rotation of said rocker member and the plunger of said one hydraulic motor supply conduit means variable orifice valve device and the plunger of said other hydraulic motor return conduit means variable orifice valve device being disposed on the other side of said axis of rotation of said rocker member, (r) with said plungers being substantially equally spaced from said axis on either side thereof, (s) and linkage means secured between said datum member and said rocker member for rocking said rocker member when angular displacement of said bridge structure occurs, (t) said variable orifice valve device plungers being so oriented with respect to said rocker member that on rocking of said rocker member said plungers are actuated in accordance with the degree of bridge structure angular displacement from said square position to vary liquid flow from said motors as required to restore the bridge structure to said square position with the trackway.

8. In an overhead crane including a bridge structure secured between wheeled trucks, with the wheels of each truck adapted to ride on a track rail of a pair of parallel track rails defining the trackway of the crane, the improvement wherein:

(a) the crane is moved in forward or reverse directions along said trackway by driving one of the wheels of each truck, (b) with said one wheels being secured to the crane for disjunctive rotating action with respect to each other, (c) and including drive means for driving said one wheels respectively, (d) said drive means each comprising reversible motor means operably coupled to said one wheels respectively for driving said bridge structure in forward or reverse directions, (e) a pair of unidirectional brake devices operatively associated with each of said one wheels, (f) with the brake devices of each pair of brake devices being operable in opposite directions, (g) said improvement further including bridge skew sensitive detecting means for sensing angular displacement of the bridge structure with respect to the trackway, and from its square position with respect to the trackway, and (h) means responsive to said detecting means for rendering said brake devices operative to retard in accordance with the degree of said angular displacement the driving action of the motor driving the leading end of the bridge structure, when said angular displacement occurs, irrespective of the direction of movement of the bridge structure, as required to maintain said bridge structure square with the trackway.

9. The improvement set forth in claim 8 wherein:

(i) said brake devices each comprise: a hub member, (j) unilaterally acting coupling means for coupling the respective hub members to said one wheels respectively, (k) and friction shoes adapted to engage the respective hub members,
(l) wherein said control means comprises a hydraulic device for each brake device for actuating the respective shoes,
(m) said hydraulic devices each comprising a hydraulic cylinder and a plunger reciprocably mounted in said cylinder,
(n) linkage means operatively connected to the respective cylinders and to said shoes, respectively, for bringing said shoes, respectively, into engagement with the respective hub members on actuation of the respective plungers,
(o) said cylinders, plungers, and linkage means being carried by said bridge structure,
(p) a rocker member carried by said bridge structure,
(q) and including means for operably connecting said rocker member to said detecting means and to said plungers.

10. The improvement set forth in claim 8 wherein:
(i) said brake devices each comprise a hub member,
(j) unilaterally acting coupling means for coupling the respective hub members to said one wheels respectively,
(k) and electromagnetic shoes adapted to engage the respective hub members,
(l) wherein said rendering means comprises an electrical device for each brake device for energizing the shoes of the respective brake devices,
(m) said electrical devices comprising a pair of resistors and means for varying the resistance of said resistors,
(n) with the electromagnetic shoes of one of the brake devices of each pair of brake devices being connected in parallel with one of said resistors,
(o) and the electromagnetic shoes of the remaining brake devices being connected in parallel with the other of said resistors,
(p) and with the respective brake devices connected to the respective resistors being operable in opposite directions to brake the motor means driving the said one wheels they are coupled to,
(q) said electrical devices being carried by said bridge structure and being connected to a source of direct current electrical energy,
(r) a rocker member carried by said bridge structure,
(s) and including means for operably connecting said rocker member to said sensing means for rocking said rocker member on skewing of said bridge structure,
(t) said rocker member and said linkage comprising said means for varying the resistance of said resistors.

11. In hydraulic overhead crane apparatus including a wheeled bridge riding on a trackway with the bridge having wheels on either end thereof that engage the trackway rails, with the bridge being driven by driving one of the wheels on each end thereof, and wherein said one wheels each have a separate hydraulic motor coupled thereto for driving same, the method of maintaining movement of the bridge in alignment with its trackway which includes:
(a) supplying a hydraulic pressure liquid feed to the motors to actuate same,
(b) and when skewing occurs, restricting the discharge from the motor that drives the end of the bridge tending on skewing to move forwardly of the other bridge end as required to restore the bridge to alignment with said trackway.

12. In a wheeled device including a frame having wheels on either side thereof adapted to run on a trackway, the improvement wherein:
(a) hydraulic means is employed for driving at least one of the wheels at each side of the frame,
(b) said one wheels being secured to said frame for disjunctive rotating action with respect to each other,
(c) said hydraulic means comprising:
(d) a hydraulic motor coupled to each of said one wheels,
(e) a hydraulic system including a hydraulic pressure liquid and hydraulic liquid flow orienting means controlling the flow of the hydraulic pressure liquid to and from the respective motors,
(f) and a sensing device associated with the hydraulic system including:
(g) a truing member carried by the frame,
(h) means for maintaining said truing member in alignment with a predetermined path of movement as the wheeled device moves along the trackway,
(i) and linkage means operably connected between said truing member and said hydraulic system for varying the flow of the hydraulic pressure liquid in said system as required to maintain said wheels square with said trackway on movement of said wheeled device along the trackway.

13. In an overhead crane including a bridge secured between trucks that include wheels running on supporting rails, the improvement wherein:
(a) hydraulic means is employed for driving at least one of the wheels of each truck,
(b) said one wheels being secured to said bridge for disjunctive rotating movement with respect to each other,
(c) said hydraulic means comprising:
(d) a hydraulic motor coupled to said one wheel of each truck,
(e) and a hydraulic system including hydraulic liquid flow orienting means controlling the flow of liquid to and from the respective motors,
(f) said motors being connected in series in said hydraulic system,
(g) a variable orifice volume flow control valve interposed in said hydraulic system between said motors,
(h) a squaring control sensing device carried by said bridge,
(i) said device including a truing member and means for maintaining said truing member in alignment with a fixed predetermined path during movement of the crane along the rails,
(j) and linkage means secured between said valve and said truing member for varying the volume flow of hydraulic liquid to the downstream motor as required to maintain said wheels square with said rails during movement of the crane along the rails.

14. In an overhead crane including a bridge secured between trucks that include wheels running on supporting rails, the improvement wherein:
(a) hydraulic means is employed for driving at least one of the wheels of each truck,
(b) said one wheels being secured to said bridge for disjunctive rotating action with respect to each other,
(c) said hydraulic means comprising:
(d) a hydraulic motor coupled to said one wheel of each truck,
(e) and a hydraulic system including hydraulic liquid flow orienting means controlling the flow of hydraulic liquid to and from the respective motors,
(f) said motors being connected in series in said hydraulic system,
(g) a variable orifice volume flow control valve interposed in said hydraulic system between said motors,
(h) means for supplying a supplemental volume flow to the hydraulic liquid flowing between the upstream motor and said flow control valve,
(i) a squaring control sensing device carried by said bridge,
(j) said device including a truing member running along and maintained in parallel relationship with one of the rails, (k) and linkage means secured between said valve and said truing member for controlling the volume flow of hydraulic liquid to the downstream motor as required to maintain said wheels square with said rails during movement of the crane along the rails.

15. In an overhead crane including a bridge secured between trucks that include wheels running on supporting rails, the improvement wherein:
   (a) hydraulic means is employed for driving at least one of the wheels of each truck,
   (b) said one wheels being secured to said bridge for disjunctive rotational movement with respect to each other,
   (c) said hydraulic means comprising:
   (d) a hydraulic motor coupled to said one wheel of each truck,
   (e) and a hydraulic system carried by the bridge including hydraulic liquid flow orienting means controlling the flow of hydraulic liquid to and from the respective motors,
   (f) conduit means extending between said motors and said flow orienting means and connecting said motors in series,
   (g) said conduit means including a bypass conduit about each of said motors connecting the upstream and downstream sides of the respective motors,
   (h) each of said bypass conduits having a volume flow control valve means and check valve means interposed therein,
   (i) said check valve means of each bypass conduit being effective to block liquid flow when the motor about which the respective bypass conduits are connected is the downstream motor with respect to the direction of liquid flow as controlled by said liquid flow orienting means,
   (j) said flow control valve means of each bypass conduit passing a predetermined volume flow,
   (k) a variable orifice volume flow control valve interposed in said hydraulic system between said motors,
   (l) a squaring control sensing device carried by said bridge,
   (m) said device including an elongate truing member running along and maintained in parallel relationship with one of the rails,
   (n) and linkage means secured between said variable orifice flow control valve and said truing member for controlling the volume flow of hydraulic liquid to the downstream motor as required to maintain said wheels square with said rails during movement of the crane along the rails.

16. In an overhead crane including a bridge secured between trucks that include wheels running on supporting rails, the improvement wherein:
   (a) hydraulic means is employed for driving at least one of the wheels of each truck,
   (b) said one wheels being secured to said bridge for disjunctive rotational movement with respect to each other,
   (c) said hydraulic means comprising:
   (d) a hydraulic motor coupled to said one wheel of each truck,
   (e) and a hydraulic system including hydraulic liquid flow orienting means controlling the flow of hydraulic liquid to and from the respective motors,
   (f) said flow orienting means including a flow orienting valve,
   (g) conduit means extending between said motors and said flow orienting means and connecting said motors in series,
   (h) said conduit means including a bypass conduit across each of said motors connecting the upstream and downstream sides of the respective motors,
   (i) each of said bypass conduits having volume flow control valve means and check valve means interposed therein,
   (j) said check valve means of each bypass conduit being effective to block liquid flow when the motor across which the respective bypass conduits are connected is the downstream motor with respect to the direction of liquid flow as controlled by said liquid flow orienting valve,
   (k) said flow control valve means of said bypass conduits passing equivalent predetermined volume flows,
   (l) a variable orifice volume flow control valve interposed in said hydraulic system between said motors,
   (m) a squaring control sensing device carried by said bridge,
   (n) said device including an elongate member running along and maintained in parallel relationship with one of the rails,
   (o) and linkage means secured between said variable orifice flow control valve and said member for controlling the volume flow of hydraulic liquid to the downstream motor as required to maintain said wheels square with said rails during movement of the crane along the rails.

17. The improvement set forth in claim 16 wherein:
   (q) said linkage means comprises a further elongate member fixed to the first mentioned elongate member and extending perpendicular thereto,
   (r) and a pair of links of substantially equal length pivotally secured to said further elongate member,
   (s) one of said links controlling the operation of said variable orifice flow control valve and other of said links being pivotally secured to the crane truck running on said one rail,
   (t) said links being maintained in parallel relationship.

18. In a wheeled structure including a driven wheel on opposite sides of the structure, the improvement wherein:
   (a) said driven wheels are each driven by a rotary hydraulic motor,
   (b) wherein said hydraulic motors are series connected in a hydraulic circuit for supplying hydraulic pressure liquid to said motors to rotate same in the same direction,
   (c) wherein a volume flow control valve is in communication with said hydraulic circuit between said motors,
   (d) said flow control valve communicating also with the hydraulic reservoir of said circuit,
   (e) and including means for controlling the liquid flow through said valve to the reservoir in accordance with the variations of movement of said wheeled structure from a predetermined path of movement.

19. The improvement set forth in claim 18 including:
   (f) means for supplying a compensating quantum of hydraulic liquid to said hydraulic circuit downstream of the upstream motor and upstream of said flow control valve.

20. In a hydraulic apparatus including a wheeled vehicle having a hydraulic motor coupled to at least one of the wheels on each side of the vehicle, the improvement wherein:
   (a) said motors of said one wheels are connected in series to a source of hydraulic liquid under pressure,
   (b) wherein a variable orifice flow control valve is interposed between said motors,
   (c) and including means for automatically setting said flow control valve as required to maintain the movement of the vehicle in alignment with a predetermined path.

21. A synchronizing hydraulic motor control circuit for supplying hydraulic pressure liquid to a pair of disjunctively related hydraulic motors from hydraulic liquid flow orienting means, said circuit comprising:
   (a) conduit means extending between said motors and the flow orienting means and connecting said motors in series, (b) said conduit means including a bypass conduit about each of said motors connecting the upstream and downstream sides of the respective motors,
(c) each of said bypass conduits having a volume flow control valve means and check valve means interposed therein,
(d) said check valve means of each bypass conduit being effective to block liquid flow when the motor about which the respective bypass conduits are connected is the downstream motor with respect to the direction of liquid flow during motor operation of said motors,
(e) said flow control valve means of each bypass conduit passing a predetermined volume flow,
(f) a variable orifice volume flow control valve means interposed in said conduit means between said motors and discharging hydraulic pressure liquid from said conduit means,
(g) and means for actuating the last mentioned valve means as required to synchronize the motive effect of said motors.

22. The circuit set forth in claim 21 wherein:
(h) said conduit means includes a conduit means, respectively, extending between each motor and the flow orienting means,
(i) and including counterbalance valve means in communication with each last mentioned conduit means,
(j) and a conduit communicating between each of the last mentioned conduit means and the counterbalance valve means on the other side of the first mentioned conduit means,
(k) each of the last mentioned conduit means having check valve means interposed therein which is connected in parallel with the counterbalance valve means thereof,
(l) the check valve means of each last mentioned conduit means being effective to block liquid flow downstream of the respective last mentioned conduit means when the latter are on the return side of the first mentioned conduit means.

23. In an overhead crane including a bridge carried adjacent its ends on wheels running on a trackway, the improvement wherein:
(a) hydraulic means is employed for driving at least one of the wheels thereof adjacent each end of the bridge,
(b) said one wheels being secured to said bridge for disjunctive rotating action with respect to each other,
(c) said hydraulic means comprising a hydraulic motor coupled to each of said one wheels,
(d) a hydraulic system including a hydraulic pressure liquid and hydraulic pressure liquid flow orienting means controlling the flow of the hydraulic pressure liquid to and from the respective motors,
(e) and a sensing device associated with the hydraulic system including a trackway follower carried by the crane,
(f) means for maintaining said follower in alignment with the trackway,
(g) and linkage means operably connected between said follower and said hydraulic system for varying the flow of the hydraulic pressure liquid in said system as required to maintain said wheels square with said trackway during movement of the crane along the trackway.

References Cited by the Examiner
UNITED STATES PATENTS

| | | | |
|---|---|---|---|
| 1,858,929 | 5/32 | Harry | 105—163 |
| 2,932,260 | 4/60 | Puma et al. | 105—163 |
| 2,935,032 | 5/60 | Tingskog | 105—163 |
| 2,984,191 | 5/61 | Smith | 105—163 |

MILTON BUCHLER, *Primary Examiner.*

JAMES S. SHANK, LEO QUACKENBUSH, *Examiners.*

UNITED STATES PATENT OFFICE
CERTIFICATE OF CORRECTION

Patent No. 3,204,577                                        September 7, 1965

Fred T. Smith

It is hereby certified that error appears in the above numbered patent requiring correction and that the said Letters Patent should read as corrected below.

Column 2, line 53, for "condition" read -- contitions --; column 9, line 56, before "squaring" insert -- or --; column 10, line 6, strike out "a"; column 14, line 19, strike out "or arm"; column 16, line 35, for "switchable" read -- suitable --; column 17, line 42, strike out "the".

Signed and sealed this 3rd day of May 1966.

(SEAL)
Attest:

ERNEST W. SWIDER                                          EDWARD J. BRENNER
Attesting Officer                                             Commissioner of Patents